(12) United States Patent
Akiyama

(10) Patent No.: US 7,281,833 B2
(45) Date of Patent: Oct. 16, 2007

(54) LED VEHICLE LAMP INCLUDING REFLECTOR WITH PARABOLOIDAL SECTIONS

(75) Inventor: Kiyohiro Akiyama, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 229 days.

(21) Appl. No.: 10/686,557

(22) Filed: Oct. 16, 2003

(65) Prior Publication Data

US 2004/0136196 A1   Jul. 15, 2004

(30) Foreign Application Priority Data

Oct. 18, 2002  (JP) .............................. 2002-304971
Aug. 29, 2003  (JP) .............................. 2003-306253

(51) Int. Cl.
    *F21S 8/10*   (2006.01)
    *F21V 7/09*   (2006.01)
    *G02B 5/09*   (2006.01)

(52) U.S. Cl. ..................... 362/545; 362/330; 362/339; 362/346; 362/348; 362/518; 359/851; 359/853

(58) Field of Classification Search ................ 362/487, 362/516–518, 520–522, 545, 247, 607, 308, 362/346, 348, 330, 339; 359/851, 853
See application file for complete search history.

(56) References Cited

U.S. PATENT DOCUMENTS

| | | | | |
|---|---|---|---|---|
| 1,199,071 A | * | 9/1916 | Heckert | ....................... 362/304 |
| 4,706,173 A | * | 11/1987 | Hamada et al. | ............. 362/341 |
| 4,929,866 A | * | 5/1990 | Murata et al. | ............... 362/311 |
| 4,994,947 A | * | 2/1991 | Fesko | ......................... 362/348 |
| 5,054,885 A | * | 10/1991 | Melby | ........................ 362/348 |
| 5,642,933 A | * | 7/1997 | Hitora | ........................ 362/243 |
| 5,692,824 A | | 12/1997 | Ooishi | |
| 5,724,183 A | * | 3/1998 | Yoshida | ....................... 362/346 |
| 6,234,646 B1 | * | 5/2001 | Ito | ............................... 362/545 |
| 6,238,073 B1 | * | 5/2001 | Ito et al. | ....................... 362/545 |
| 6,264,346 B1 | * | 7/2001 | Pashley et al. | ............. 362/348 |
| 6,380,864 B1 | | 4/2002 | Richard | |
| 6,637,923 B2 | * | 10/2003 | Amano | ....................... 362/545 |
| 6,672,746 B2 | * | 1/2004 | Amano | ....................... 362/545 |
| 6,796,695 B2 | * | 9/2004 | Natsume | ..................... 362/518 |
| 6,805,476 B2 | * | 10/2004 | Amano | ....................... 362/545 |
| 6,811,277 B2 | * | 11/2004 | Amano | ....................... 362/602 |
| 6,814,475 B2 | * | 11/2004 | Amano | ....................... 362/487 |
| 6,814,480 B2 | * | 11/2004 | Amano | ....................... 362/545 |
| 2003/0035298 A1 | | 2/2003 | Amano | |
| 2003/0035299 A1 | | 2/2003 | Amano | |

(Continued)

FOREIGN PATENT DOCUMENTS

DE    195 38 645 A1    5/1996

(Continued)

*Primary Examiner*—Jong-Suk (James) Lee
*Assistant Examiner*—Ismael Negron
(74) *Attorney, Agent, or Firm*—Foley & Lardner LLP

(57) ABSTRACT

A vehicle lamp includes a set of alternatively provided first and second reflection surfaces that reflect the light emitted by a first and second respective diodes toward a lamp lens. Each of the first and second reflection surface is a part of a rotational paraboloid having a focus on a light emission source of a respective one of the first and second diodes such that the paraboloids corresponding to reflection surfaces that are farther from the their respective diodes have longer focal lengths.

19 Claims, 24 Drawing Sheets

U.S. PATENT DOCUMENTS

| | | |
|---|---|---|
| 2003/0043593 A1 | 3/2003 | Amano |
| 2003/0053318 A1 | 3/2003 | Amano |
| 2003/0169600 A1 | 9/2003 | Amano |

FOREIGN PATENT DOCUMENTS

| | | |
|---|---|---|
| DE | 196 38 081 A1 | 3/1998 |
| EP | 0 830 984 A2 | 3/1998 |
| EP | 0 974 485 A2 | 1/2000 |
| EP | 1 094 271 A2 | 4/2001 |
| JP | 01-251502 | 10/1989 |
| JP | 7-230709 | 8/1995 |
| JP | 9-180514 A | 7/1997 |
| JP | 2960928 B1 | 7/1999 |
| JP | 11-306810 | 11/1999 |
| JP | 2001-118408 | 4/2001 |
| JP | 2003-059312 A | 2/2003 |
| JP | 2003-059313 A | 2/2003 |
| JP | 2003-068115 A | 3/2003 |
| JP | 2003-100114 A | 4/2003 |
| JP | 2003-100116 A | 4/2003 |

* cited by examiner

LED VEHICLE LAMP INCLUDING REFLECTOR WITH PARABOLOIDAL SECTIONS

BACKGROUND OF THE INVENTION

1) Field of the Invention

The present invention relates to a vehicle lamp that uses light emitting diodes (hereinafter, "LED"s) as light emission sources and includes lamp lenses and a plurality of reflection surfaces.

2) Description of the Related Art

Vehicle lamps are disclosed in, for example, European Patent Application Publication No. 830984 (German Patent Application Publication No. 19638081), U.S. patent application Publication Nos. 2003/35298, 2003/35299, 2003/43593, and 2003/53318.

Such vehicle lamps normally include LEDs provided in a lamp, lamp lenses serving as a light emission area, and a many reflection surfaces that reflect, toward the lamp lenses, lights emitted from the LEDs. The light emitted by each LED is reflected by the reflection surfaces toward the lamp lenses and the reflected light falls on the lamp lenses. As a result, when the vehicle lamp is viewed from the outside, the light emission area of the lamp lenses appears to emit lights almost over its entire surface. Examples of the lamp lens of this type include, for example, a tail lamp, a stop lamp, a high mount stop lamp, a turn signal lamp, a tail and stop lamp, a high mount tail and stop lamp, a combination lamp of a turn signal lamp and a tail lamp, a combination lamp of a turn signal lamp and a stop lamp.

SUMMARY OF THE INVENTION

It is an object of the present invention to solve at least the problems on the conventional technology.

A vehicle lamp according to one aspect of the present invention includes a first light emitting diode that is arranged at a first location and that emits light in a first area; a second light emitting diode that is arranged at a second location different from the first location and that emits light in a second area; a lamp lens having a light emission area; a plurality of first reflection surfaces that reflect the light emitted by the first light emitting diode toward the lamp lens; and a plurality of second reflection surfaces that reflect light emitted by the second light emitting diode toward the lamp lens. The first reflection surfaces and the second reflection surfaces are alternately provided over almost entire of the light emission area of the lamp lens, the first reflection surfaces are arranged almost in the first area, the second reflection surfaces are arranged almost in the second area, each of the first reflection surface is a part of a rotational paraboloid having a focus on a light emission source of the first light emitting diode such that the paraboloids corresponding to the first reflection surfaces that are farther from the first light emitting diode have longer focal lengths, and each of the second reflection surface is a part of a rotational paraboloid having a focus on a light emission source of the second light emitting diode such that the paraboloids corresponding to the second reflection surfaces that are farther from the second light emitting diode have longer focal lengths.

A vehicle lamp according to another aspect of the present invention includes a light emitting diode that emits light; a lamp lens having a light emission area; a plurality of reflection surfaces that reflect the lights emitted by the light emitting diodes; and a plurality of mirror finished surfaces that do not function to reflect the light emitted by the light emitting diodes but function to reflect an outside light incident from the lamp lens. The reflection surfaces and the mirror finished surfaces are alternately provided over almost entire of the light emission area, the reflection surfaces are arranged almost within a range of an illumination angle of the light emitted by the light emitting diode, each of the reflection surface is a part of a rotational paraboloid having a focus on a light emission source of the light emitting diode such that the paraboloids corresponding to the reflection surfaces that are farther from the light emitting diode have longer focal lengths, and each of the mirror finished surfaces is arranged on a segment that connects the light emission source of the light emitting diode to one of boundaries between the reflection surfaces and the mirror finished surfaces, or arranged on an opposite side to a light reflection direction of the reflection surfaces from the segment.

The other objects, features and advantages of the present invention are specifically set forth in or will become apparent from the following detailed descriptions of the invention when read in conjunction with the accompanying drawings.

DETAILED DESCRIPTION

Exemplary embodiments of the present invention will be explained hereinafter with reference to the accompanying drawings. It should be noted that the present invention is not limited to these embodiments. In the embodiments, "upper" and "lower" means "upper" and "lower" in a perpendicular direction when a vehicle lamp is installed in a vehicle, and "left" and "right" means "left" and "right" in a horizontal direction when the vehicle lamp is installed in the vehicle, respectively.

FIG. 1 to FIG. 13 illustrate a vehicle lamp according to a first embodiment of the present invention. The first embodiment relates to a tail and stop lamp 1, which is an example of the vehicle lamp. The configuration of the tail and stop lamp that is the vehicle lamp in the first embodiment will be explained in detail.

Figure 3:
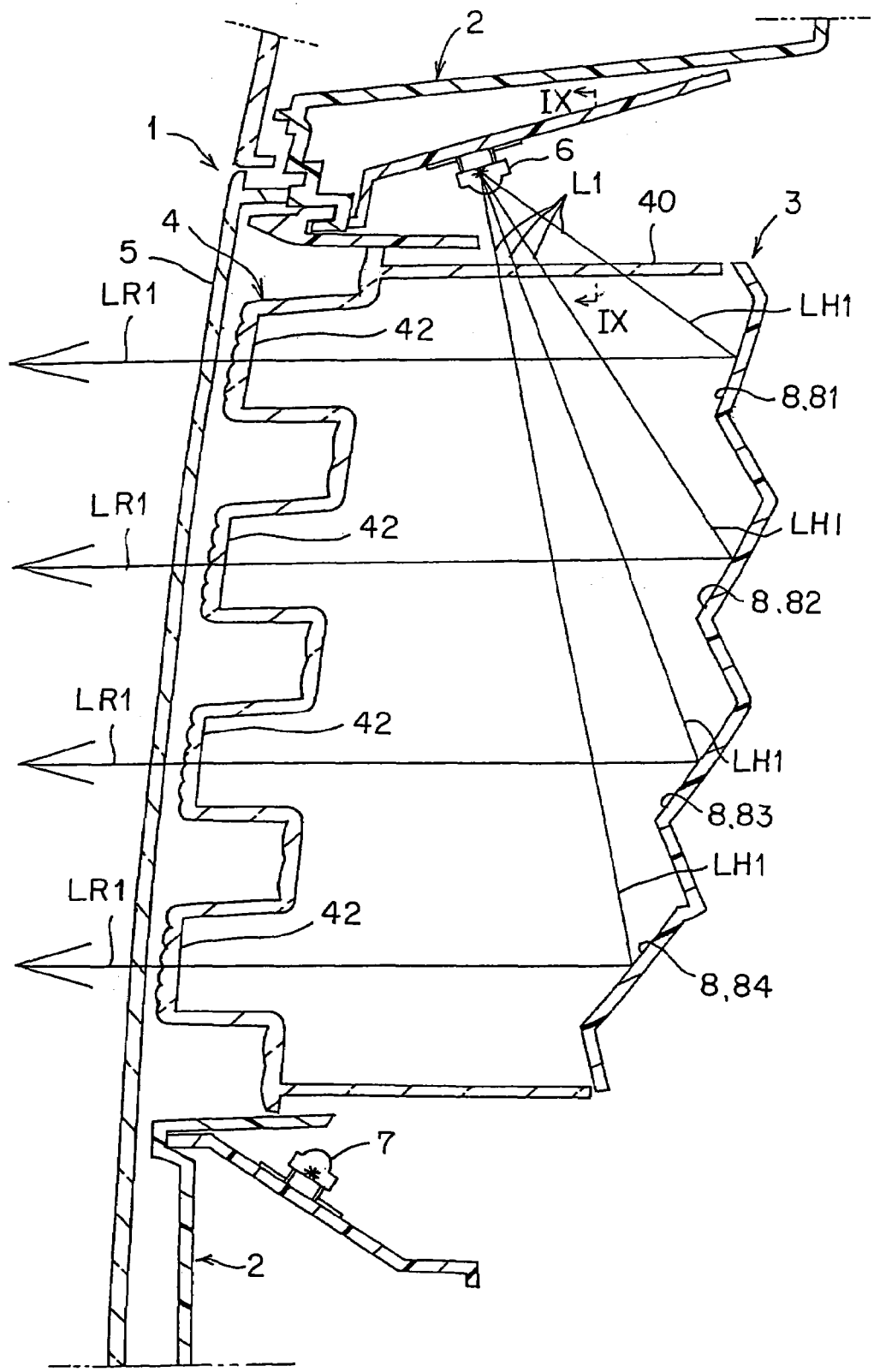
FIG. 3 is a cross-section along the line A-A of FIG. 5 and illustrates the reflecting function of the four vertical first reflection surfaces in the first embodiment.
Figure 4:
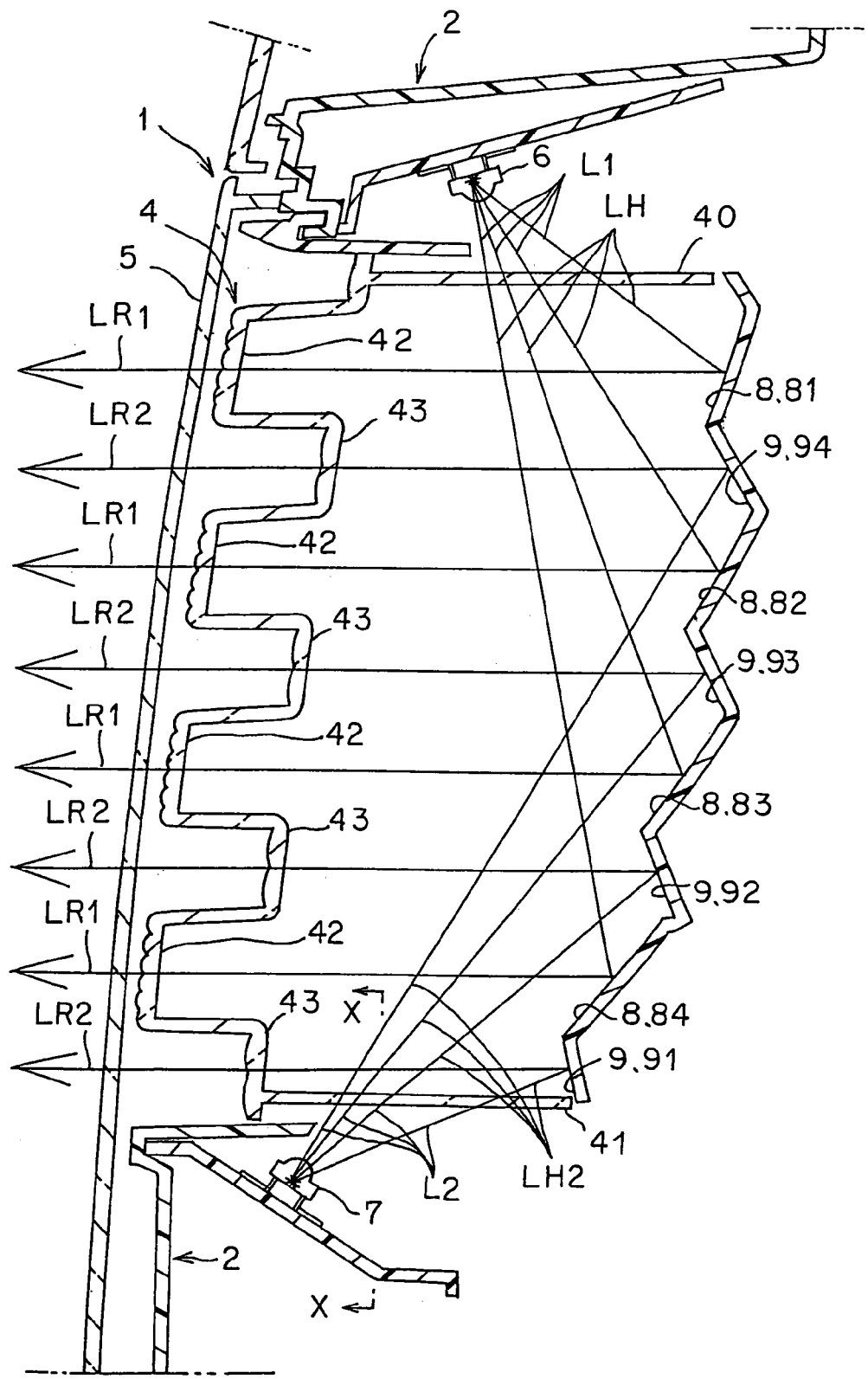
FIG. 4 is a cross-section along the line A-A of FIG. 5 and illustrates the reflecting function of the four vertical first reflection surfaces and that of the four vertical second reflection surfaces in the first embodiment.
Figure 5:
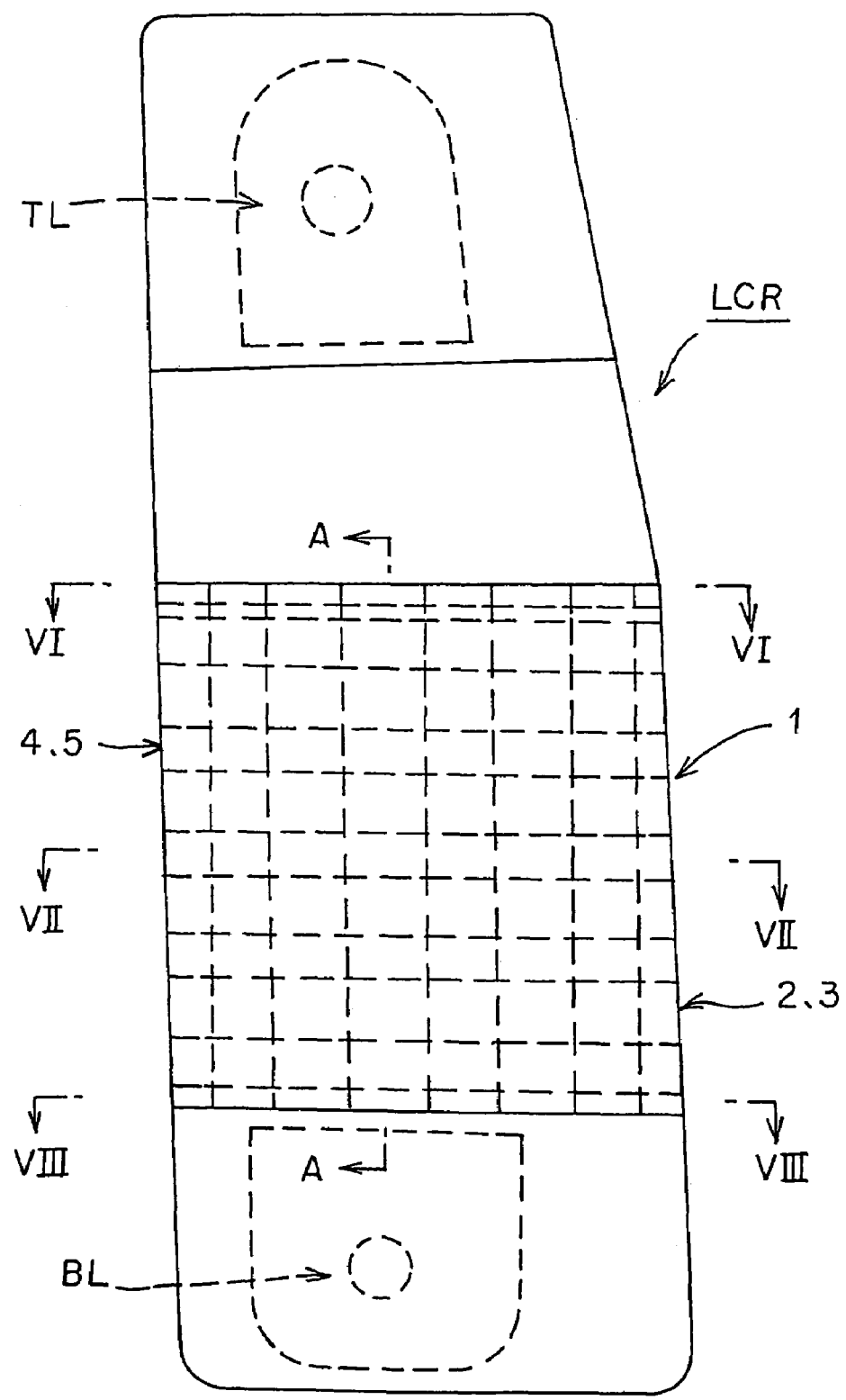
FIG. 5 is a front view of-a rear combination lamp including a tail and stop lamp.
Figure 6:
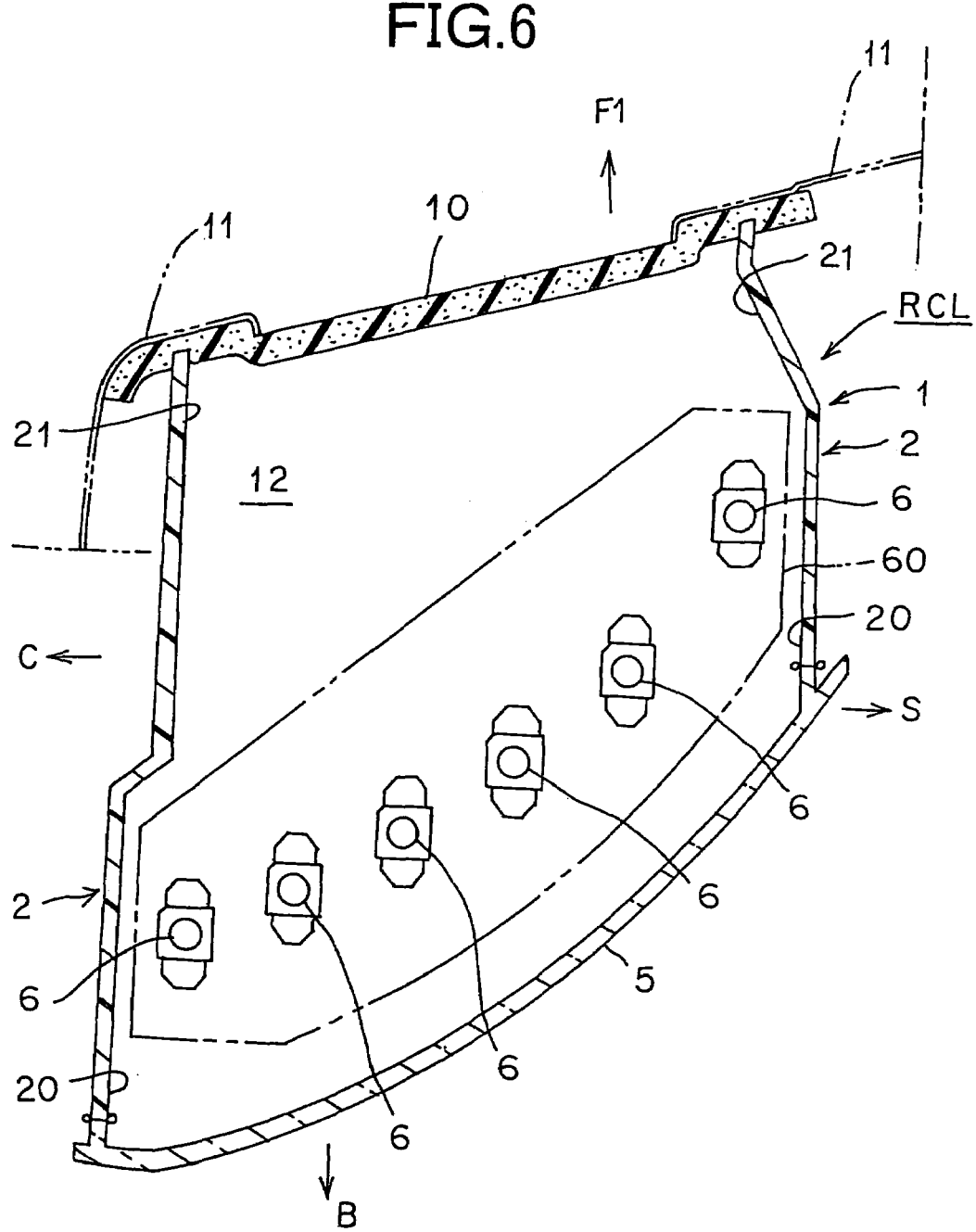
FIG. 6 is a cross-section along a line VI-VI of FIG. 5.
Figure 7:
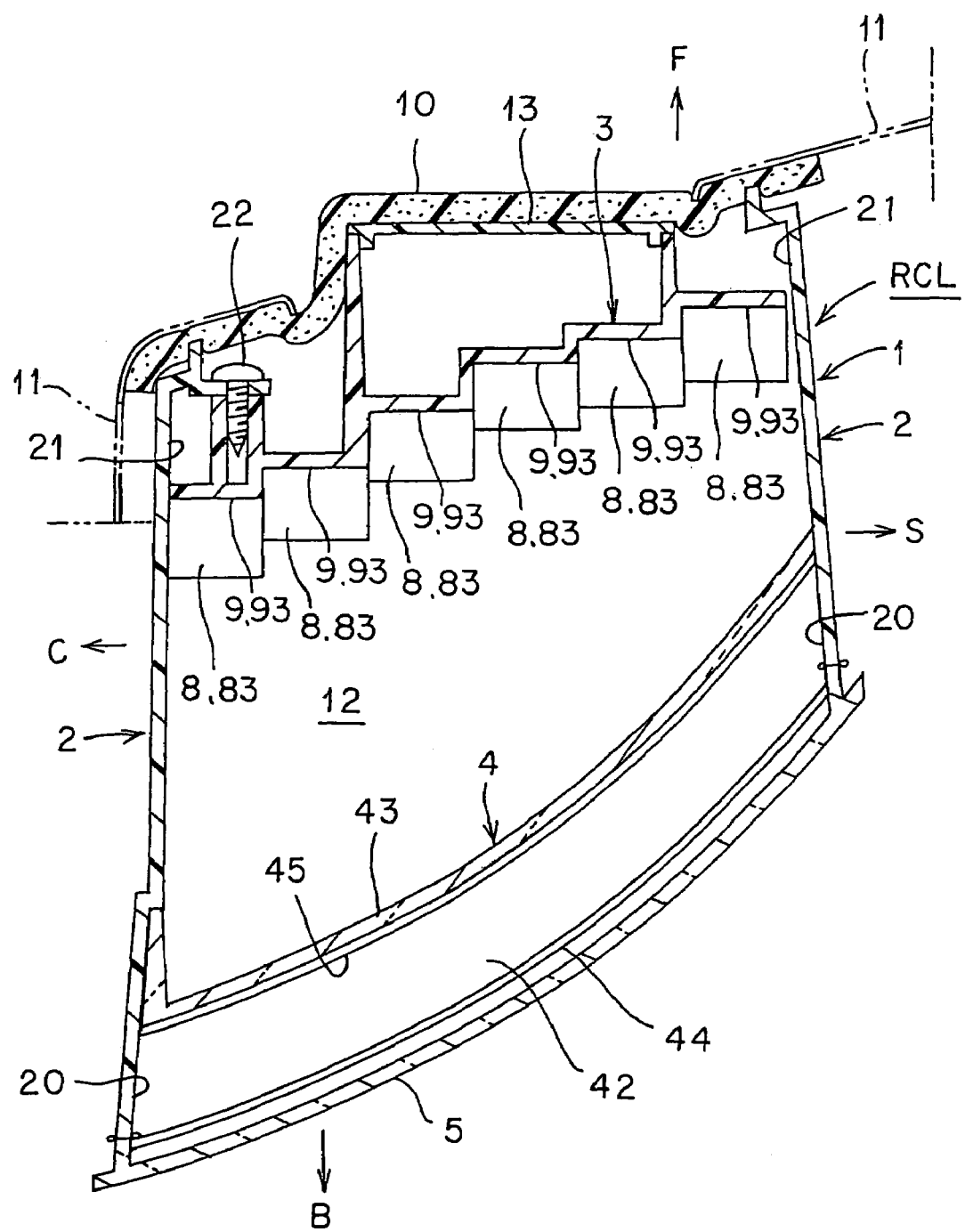
FIG. 7 is a cross-section along a line VII-VII of FIG. 5.
Figure 8:
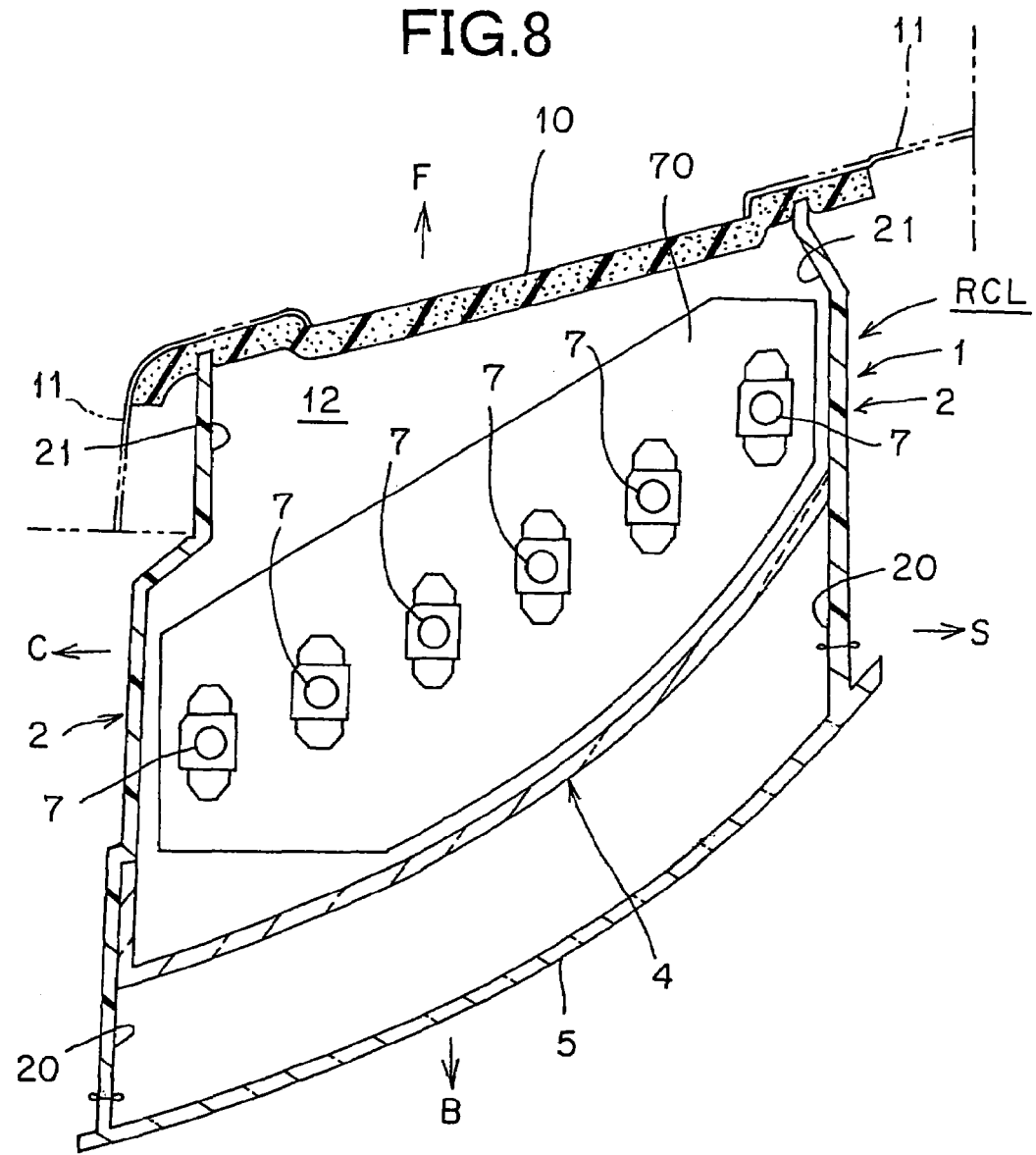
FIG. 8 is a cross-section along a line VIII-VIII of FIG. 5.

As illustrated in FIG. 5, the tail and stop lamp 1 is combined with a turn signal lamp TL and a back lamp BL to constitute a rear combination lamp RCL. As illustrated in FIG. 6 to FIG. 8, a front surface of the rear combination lamp RCL including the tail and stop lamp 1 is curved and inclined from a vehicle back side B toward a vehicle front side F over a vehicle center side C to a vehicle side S. As illustrated in FIG. 6 to FIG. 8, the rear combination lamp RCL including the tail and stop lamp 1 is attached to a vehicle body 11 by attachment units (not illustrated) such as bolts and nuts through a packing 10. As a result, the rear combination lamps RCL are installed on left and right sides in a rear portion of a vehicle (not illustrated), respectively. The tail and stop lamp 1 illustrated by FIG. 1 to FIG. 12 is installed on the right of the rear portion of the vehicle.

The tail and stop lamp 1 includes a lamp housing 200, an inner housing 3, lamp lenses serving as a common light emission area, i.e., an inner lens 4 and an outer lens 5 that transmits lights almost as they progress, a plurality of first LEDs 6 and a plurality of second LEDs 7 serving as light sources, a plurality of first reflection surfaces 8, and a plurality of second reflection surfaces 9.

The lamp housing 200 is made of, for example, a synthetic resin. As illustrated in FIG. 1 to FIG. 4 and FIG. 6 to FIG. 8, this lamp housing 200 has a hollow structure in which a front surface 20 and a rear surface 21 thereof are opened and peripheral edges of the lamp housing 200 are closed. The inner housing 3 is fixed to an edge of the opened rear surface 21 of the lamp housing 200 by a screw 22. The inner lens 4 and the outer lens 5 are fixed to the edge of the opened front surface 20 of the inner housing 200 by welding or the like. As a result, in the tail and stop lamp 1, a lamp chamber 12 is defined by the lamp housing 200, the inner housing 3, the inner lens 4, and the outer lens 5. In FIG. 7, reference symbol 13 denotes a cover made of, for example, a resin and provided on a rear surface of the inner housing 3.

As illustrated in FIG. 6, the plural first LEDs or, in this embodiment, six first LEDs 6 are arranged on a first substrate 60. The first substrate 60 is fixed to the lamp housing 200 on the upper side of the lamp chamber 12. As a result, the six first LEDs 6 are arranged on the upper side of the lamp chamber 12 of the tail and stop lamp 2, i.e., on one side of the lamp. The six first LEDs 6 are light emission sources for tail and stop, and LEDs that emits red light are employed as the first LEDs 6. As illustrated in FIG. 3 and FIG. 4, the sixth first LEDs 6 illuminate lights L1 and LH1 from the upper side or one side of the lamp toward the lower side or the other side thereof.

As illustrated in FIG. 8, the plural second LEDs 7, six second LEDs 7 as many as the first LEDs 6 in this embodiment, are arranged on a second substrate 70. The second substrate 70 is fixed to the lamp housing 200 that is on the lower side of the room chamber 12. As a result, the six second LEDs 7 is arranged on the lower side of the room chamber 12 of the tail and stop lamp 1, i.e., the other side of the lamp. The six second LEDs 7 are light emission sources for stop and LEDs that emit red light are employed as the second LEDs 7. As illustrated in FIG. 4, the six second LEDs 7 illuminate lights L2 and LH2 from the lower side or the other side of the lamp toward the upper side or one side thereof.

Figure 1:
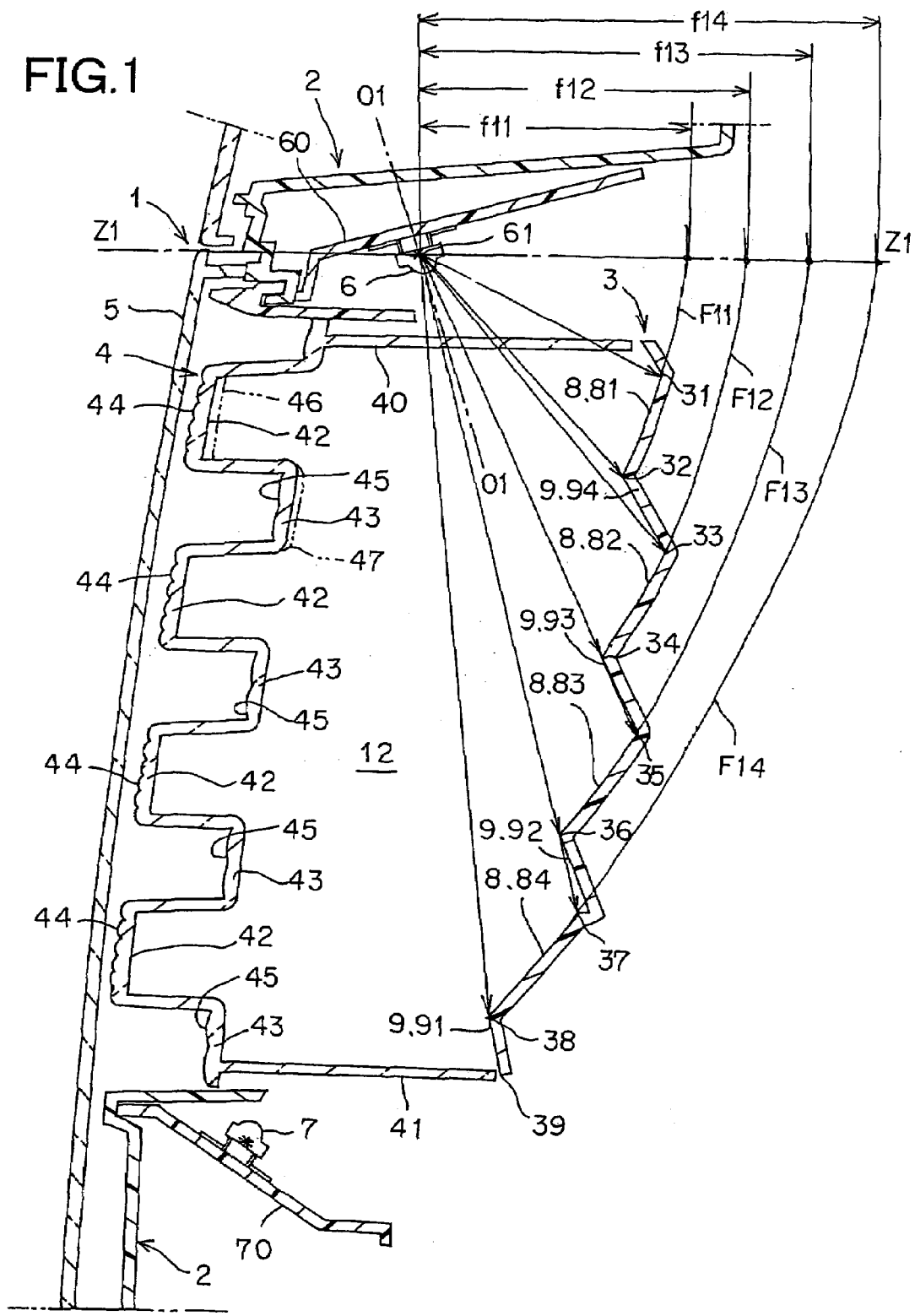
FIG. 1 is a cross-sectional view of a vehicle lamp according to a first embodiment the present invention and specifically illustrates the cross-section along a line A-A of FIG. 5 and illustrates the structure of four vertical first reflection surfaces.
Figure 2:
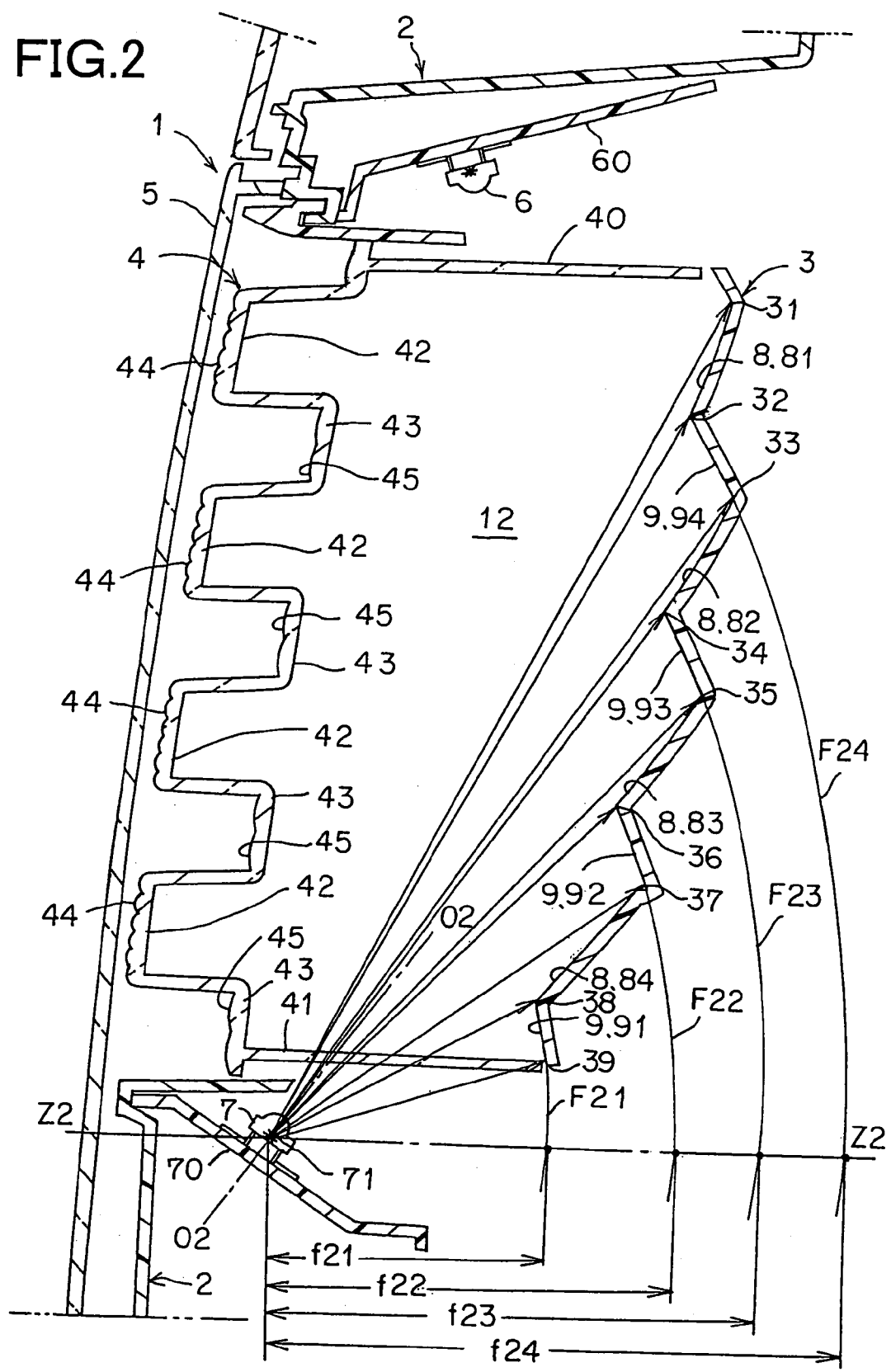
FIG. 2 is a cross-section along the line A-A of FIG. 5 and illustrates the structure of four vertical second reflection surfaces in the first embodiment.

The six first LEDs 6 and the six second LEDs 7 are electrically connected to a power supply (not illustrated) such as a battery. As illustrated in FIG. 1, a 0° axis (O1-O1) of each of the six first LEDs 6 is inclined toward the first reflection surfaces 8 relative to an optical axis Z1-Z1 to be explained later. As illustrated in FIG. 2, a 0° axis (O2-O2) of each of the six first LEDs 6 is inclined toward the second reflection surfaces 9 relative to an optical axis Z2-Z2 to be explained later.

Ordinary and standard LEDs (commercially available LEDs) are employed as the six first LEDs 6 and the six second LEDs 7. Namely, as the LEDs 6 and 7, LEDs having standard directivity characteristics that a directional angle (a diffusion angle) of an illumination light (indicated by a thick solid line in FIG. 13) is 30° to 35° with respect to the 0° axis (O1-O1, O2-O2, or O—O) and an illumination angle of the illumination light having a highest luminous intensity of 1.0 is 20° to 25° with respect to the 0° axis (O1-O1, O2-O2, or O—O) are employed. The directional angle is an angle formed between a segment that connects a point of the illumination light having a luminous intensity of 0.5 to a point thereof having a luminous intensity of 0 (light emission sources 61 to 71) and the 0° axis (O1-O1, O2-O2, or O—O) and exhibits directivity characteristics (half angle). The illumination angle of the illumination light having the highest luminous intensity of 1.0 is an angle formed between a segment that connects a point of the illumination light having the highest luminous intensity of 1.0 and a point thereof having the luminous intensity of 0 (light emission sources 61 to 71) and the 0° axis (O1-O1, O2-O2, or O—O).

An inner surface of the inner housing 3 is deposited with aluminum or coated with silver, and the first reflection surfaces 8 and the second reflection surfaces 9 are formed on the inner surface of the inner housing 3. As illustrated in FIG. 3 and FIG. 4, the first reflection surfaces 8 reflect the lights L1 and LH1 from each first LED 6 that are illuminated from the upper side or one side of the lamp toward the lower side or the other side thereof in a predetermined direction, that is, reflects the lights L1 and LH1 in the lamp lenses (the inner lens 4 and the outer lens 6). As illustrated in FIG. 4, the, second reflection surfaces 9 reflect the lights L2 and LH2 from the second LEDs 7 that are illuminated from the lower side or the other side of the lamp toward the upper side or one side thereof, in a direction almost equal to a light reflection direction of the first reflection surfaces 8, that is, reflects the lights L2 and LH2 in the lamp lenses.(the inner lens 4 and the outer lens 5).

The first reflection surfaces 8 are formed out of parts of rotational paraboloids, respectively. In this embodiment, four vertical first reflection surfaces are formed per first LED 6. That is, as illustrated in FIG. 1, the vertical four first reflection surfaces 8 (81, 82, 83, and 84) are formed out of parts of rotational paraboloids F11, F12, F13, and F14 having a focus on the light emission source 61 of the first LED 6 and focal lengths f11, f12, f13, and f14 that are larger from up to down (i.e., as the paraboloids are farther from the first LED 6), respectively. The four vertical first reflection surfaces 8 (81, 82, 83, and 84) are arranged within ranges of illumination angles of the lights L1 and LH1 from the first LED 6, respectively. Each of the illumination angle ranges almost coincides with a range of the directional angle (diffusion angle) of the first LED 6. In addition, directions of optical axes Z1-Z1 of the four vertical first reflection surfaces 8 (81, 82, 83, and 84) formed out of parts of the rotational paraboloids F11, F12, F13, and F14 (rotational axes of the rotational paraboloids F11, F12, F13, and F14) almost coincide with one another. Alternatively, the four vertical first reflection surfaces 8 (81, 82, 83, and 84) may have optical axes different in direction.

In the same manner as the first reflection surfaces 8, the second reflection surfaces 9 are formed out of parts of rotational paraboloids, respectively. Four upper and four second reflection surfaces are formed per second LED 7. That is, as illustrated in FIG. 2;the vertical four second reflection surfaces 9 (91, 92, 93, and 94) are formed out of parts of rotational paraboloids F21, F22, F23, and F24 having a focus on the light emission source 71 of the second LED 7 and focal lengths f21, f22, f23, and f24 that are larger from up to down (i.e., as the paraboloids are farther from the second LED 7), respectively. The four vertical second reflection surfaces 9 (91, 92, 93, and 94) are arranged within ranges of illumination angles of the lights L2 and LH2 from the second LED 7, respectively. Each of the illumination angle ranges almost coincides with a range of the directional angle (diffusion angle) of the second LED 7. In addition, directions of optical axes Z2-Z2 of the four vertical second reflection surfaces 9 (91, 92, 93, and 94) formed out of parts of the rotational paraboloids F21, F22, F23, and F24 (rotational axes of the rotational paraboloids F21, F22, F23, and F24) almost coincide with one another. Alternatively, the four vertical second reflection surfaces 9 (91, 92, 93, and 94) may have optical axes different in direction.

As illustrated in FIG. 1 to FIG. 4, the four vertical first reflection surfaces 8 (81, 82, 83, and 84) and the four vertical second reflection surfaces 9 (91, 92, 93, and 94) are vertically, alternately formed on the inner surface of the inner housing 3. That is, the first reflection surface 81 from the top of the first reflection surfaces 8, the fourth reflection surface 94 from the bottom of the second reflection surfaces 9, the second reflection surface 82 from the top of the first reflection surfaces 8, the third reflection surface 93 from the bottom of the second reflection surfaces 9, the third reflection surface 83 from the top of the first reflection surfaces 8, the second reflection surface 92 from the bottom of the second reflection surface 9, the fourth reflection surface 84 from the top of the first reflection surfaces 8, and the first reflection surface 91 from the bottom of the second reflection surfaces 9 are vertically, alternately, and continuously formed on the inner surface of the inner housing 3 from up to down.

The first reflection surface 81 from the top of the first reflection surfaces 8 is formed on the inner surface of the inner housing 3 between an arbitrary first boundary 31 on the first rotational paraboloid F11 for the first reflection surfaces 8 and a second boundary 32 in which the first rotational paraboloid F11 for the first reflection surfaces 8 intersects the fourth rotational paraboloid F24 for the second reflection surfaces 8. The fourth reflection surface 94 from the bottom of the second reflection surfaces 9 is formed on the inner surface of the inner housing 3 between the second boundary 32 in which the first rotational paraboloid F11 for the first reflection surfaces 8 intersects the fourth rotational paraboloid for the second reflection surfaces 8 and a third boundary 33 in which the second rotational paraboloid F12 for the first reflection surfaces 8 intersects the fourth rotational paraboloid F24 for the second reflection surfaces 8.

The second reflection surface 82 from the top of the first reflection surfaces 8 is formed on the inner surface of the inner housing 3 between the third boundary 33 in which the second rotational paraboloid F12 for the first reflection surfaces 8 intersects the fourth rotational paraboloid F24 for the second reflection surfaces 8 and a fourth boundary 34 in which the second rotational paraboloid F12 for the first reflection surfaces 8 intersects the third rotational paraboloid F23 for the second reflection surfaces 9. The third reflection surface 93 from the bottom of the second reflection surfaces 9 is formed on the inner surface of the inner housing 3 between the fourth boundary 34 in which the second rotational paraboloid F12 for the first reflection surfaces 8 intersects the third rotational paraboloid F23 for the second reflection surfaces 9 and a fifth boundary 35 in which the third rotational paraboloid F13 for the first reflection surfaces 8 intersects the third rotational paraboloid F23 for the second reflection surfaces 9.

The third reflection surface 83 from the top of the first reflection surfaces 8 is formed on the inner surface of the inner housing 3 between the fifth boundary 35 in which the third rotational paraboloid F13 for the first reflection surfaces 8 intersects the third rotational paraboloid F23 for the second reflection surfaces 9 and a sixth boundary 36 in which the third rotational paraboloid F13 for the first reflection surfaces 8 intersects the second rotational paraboloid F22 for the second reflection surfaces 9. The second reflection surface 92 from the bottom of the second reflection surfaces 9 is formed on the inner surface of the inner housing 3 between the sixth boundary 36 in which the third rotational paraboloid F13 for the first reflection surfaces 8 intersects the second rotational paraboloid F22 for the second reflection surfaces 9 and a seventh boundary 37 in which the fourth rotational paraboloid F14 for the first reflection surfaces 8 intersects the second rotational paraboloid F22 for the second reflection surfaces 9. The fourth reflection surface 84 from the top of the first reflection surfaces 8 is formed on the inner surface of the inner housing 3 between the seventh boundary 37 in which the fourth rotational paraboloid F14 for the first reflection surfaces 8 intersects the second rotational paraboloid F22 for the second reflection surfaces 9 and an eighth boundary 38 in which the fourth rotational paraboloid F14 for the first reflection surfaces 8 intersects the first rotational paraboloid F21 for the second reflection surfaces 9.

The first reflection surface 91 from the bottom of the second reflection surfaces 9 is formed on the inner surface of the inner housing 3 between the eighth boundary 38 in which the fourth rotational paraboloid F14 for the first reflection surfaces 8 intersects the first rotational paraboloid F21 for the second reflection surfaces 9 and a ninth boundary 39 in which the first rotational paraboloid F21 for the second reflection surfaces 9 intersects an arbitrary ninth boundary 39 on the first rotational paraboloid F21 for the second reflection surfaces 9.

Figure 11:
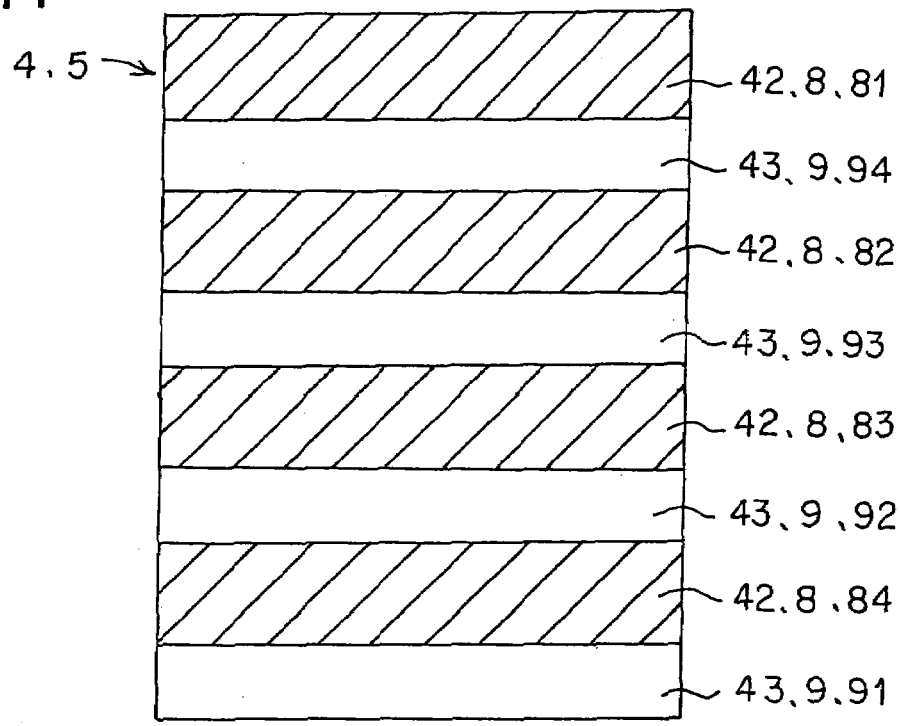
FIG. 11 is an explanatory view which illustrates four horizontal strip luminous states of an inner lens and an outer lens when each first LED emits lights in the first embodiment.
Figure 12:
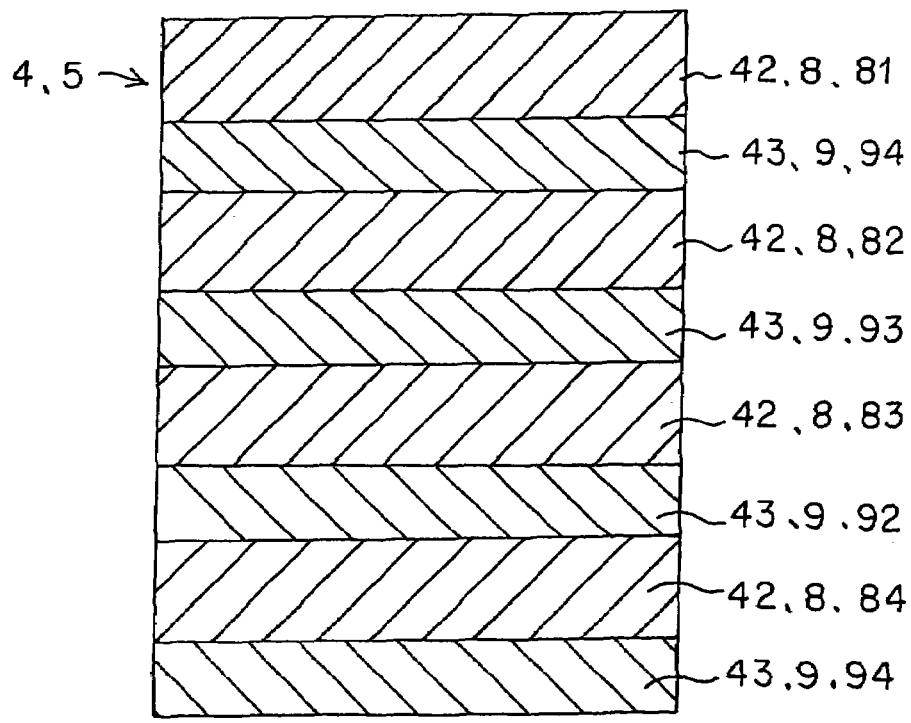
FIG. 12 is an explanatory view of a luminous state on the entire surface of the inner lens and the outer lens when each first LED and each second LED emit lights in the first embodiment.

The four vertical first reflection surfaces 8 (81, 82, 83, and 84) are formed per first LED 6. Therefore, if the number of the first LEDs 6 is six, 4×6=24, i.e., 24 first reflection surfaces 8 (81, 82, 83, and 84) are formed on the inner surface of the inner housing 3. On the other hand, the four vertical second reflection surfaces 9 (91, 92, 93, and 94) are formed per second LED 7. Therefore, if the number of the second LEDs 7 is six, 4×6=24, i.e., 24 second reflection surfaces 9 (91, 92, 93, and 94) are formed on the inner surface of the inner housing 3. As illustrated in FIG. 11 and FIG. 12, the 24 first reflection surfaces 8 (81, 82, 83, and 84) and the 24 second reflection surfaces 9 (91, 92, 93, and 94) are alternately arranged in a common area almost over its entire surface. The common area, in which the 24 first reflection surfaces 8 (81, 82, 83, and 84) and the 24 second reflection surfaces 9 (91, 92, 93, and 94) are arranged, almost corresponds to a common light emission area (indicated by slant lines in FIG. 11 and FIG. 12) to the lamp lenses (the inner lens 4 and the outer lens 5).

Figure 9:
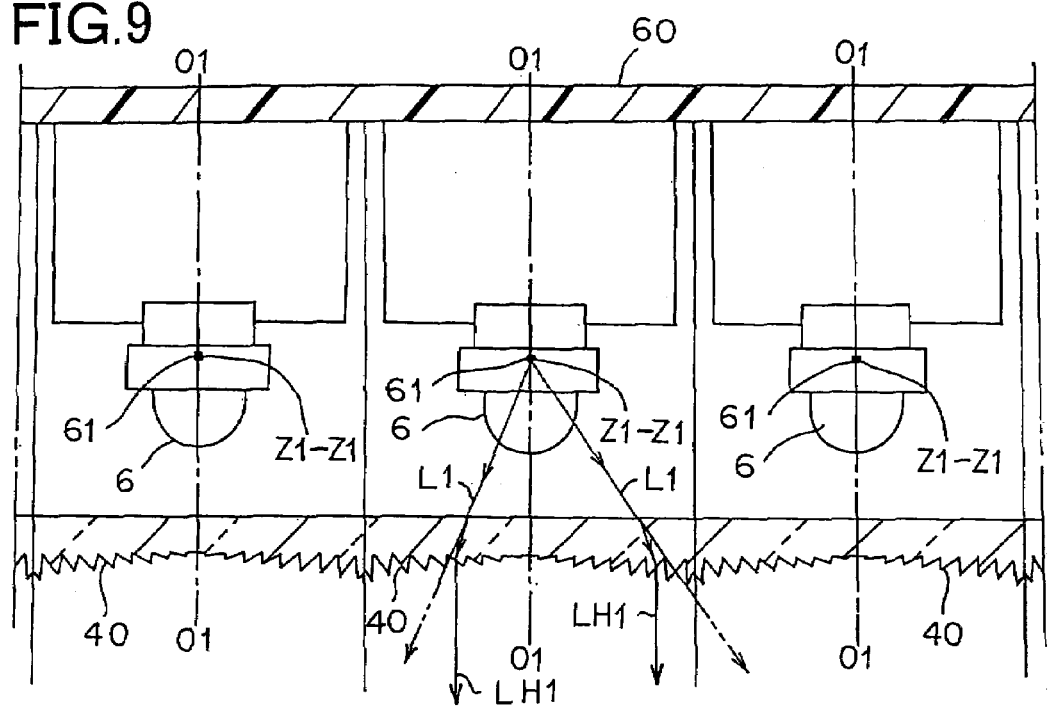
FIG. 9 is a cross-section along a line IX-IX of FIG. 3.

As illustrated in FIG. 1 to FIG. 4 and FIG. 9, a first linear Fresnel prism element group 40 is arranged between the first LED 6 and the four vertical first reflection surfaces 8 (81, 82, 83, and 84) of each unit to be explained later. The first linear Fresnel prism element group 40 is provided integrally with an upper end of the inner lens 4. As illustrated in FIG. 3 and FIG. 4, the first linear Fresnel prism element group 40 transmits the lights L1 from the first LED 6 almost as they progress in a cross section that includes the first LED 6 and the four vertical first reflection surfaces 8 (81, 82, 83, and 84). Further, as illustrated in FIG. 9, the first linear Fresnel prism element group 40 refracts and transmits the lights L1 from the first LED 6 as almost parallel lights LH1 in a cross section orthogonal to the light (lights LR1 in FIG. 3 and FIG. 4) reflection direction (the direction of the optical axis Z1-Z1) of the four vertical first reflection surfaces 8 (81, 82, 83, and 84).

Figure 10:
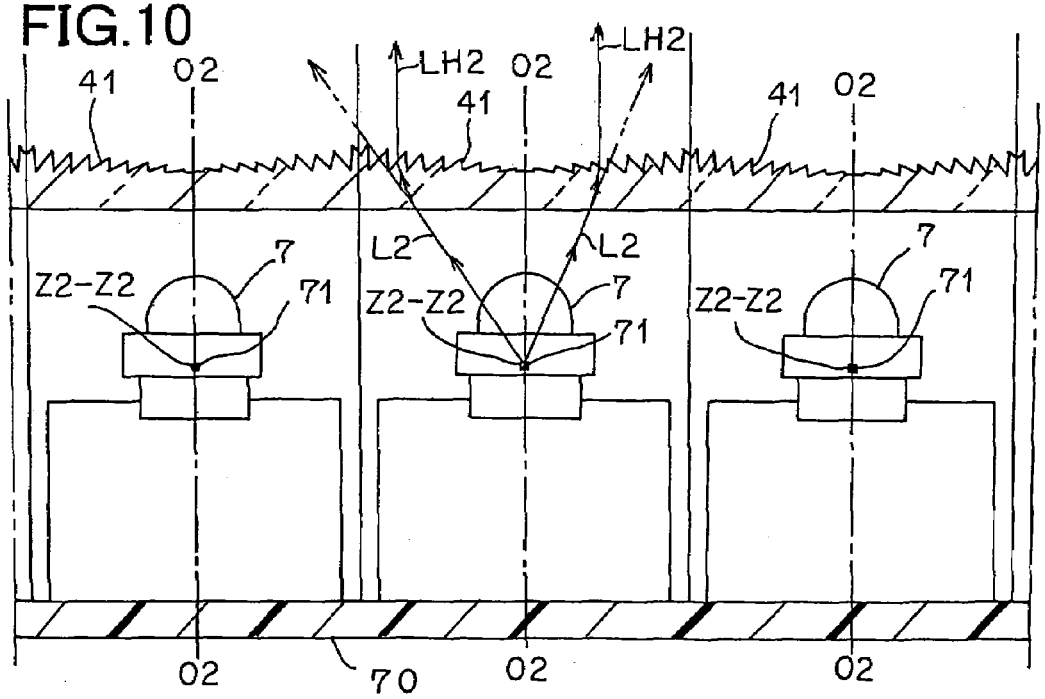
FIG. 10 is a cross-section along a line X-X of FIG. 4 in the first embodiment.

As illustrated in FIG. 1 to FIG. 4 and FIG. 10, a second linear Fresnel prism element group 41 is arranged between the second LED 7 and the four vertical second reflection surfaces 9 (91, 92, 93, and 94) of each unit. The second linear Fresnel prism element group 41 is provided integrally with a lower end of the inner lens 4. As illustrated in FIG. 4, the second linear Fresnel prism element group 41 transmits the lights L2 from the second LED 7 almost as they progress in a cross section that includes the second LED 7 and the four vertical second reflection surfaces 9 (91, 92, 93, and 94). Further, as illustrated in FIG. 10, the second linear Fresnel prism element group 41 refracts and transmits the lights L2 from the second LED 7 as almost parallel lights LH2 in a cross section orthogonal to the light (lights LR2 in FIG. 4) reflection direction (the direction of the optical axis Z2-Z2) of the four vertical second reflection surfaces 9 (91, 92, 93, and 94).

It is assumed herein that the one first LED 6, the four vertical first reflection surfaces 8 (81, 82, 83, and 84), the one first linear Fresnel prism element group 40, the one second LED 7, the four vertical second reflection surfaces 9 (91, 92, 93, and 94), and the one second linear Fresnel prism element group 41 constitute one unit. Therefore, the tail and stop lamp 1 in this embodiment has six units. As illustrated in FIG. 6 to FIG. 8, the six units are arranged to be longitudinally shifted from one another along a curved inclination on a front surface of the tail and stop lamp. That is, the first LED 6, the first reflection surfaces 8 (81, 82, 83, and 84), the second reflection surfaces 9 (91, 92, 93, and 94), and the second LED 7 (as well as the first linear Fresnel prism element group 40 and the second linear Fresnel prism element group 41, which are not illustrated in FIG. 6 and FIG. 8) of each vehicle center side C unit are arranged on a vehicle rear side B. The first LED 6, the first reflection surfaces 8 (81, 82, 83, and 84), the second reflection surfaces 9 (91, 92, 93, and 94), and the second LED 7 (as well as the first linear Fresnel prism element group 40 and the second linear Fresnel prism element group 41, which are not illustrated in FIG. 6 and FIG. 8) of each vehicle center side S unit are arranged on a vehicle rear side F. In this embodiment, the number of units is six, however, the number of units may be one or plural other than six. In addition, the six units are arranged to be longitudinally shifted from one another in this embodiment, however, they may be arranged linearly in a horizontal (lateral) direction. Illumination directions of the lights (LR1 and LR2 shown in FIG. 3 and FIG. 4) of the units, i.e., the direction, parallel to the optical axis Z1-Z1 of the first reflection surfaces 8 and that parallel to the optical axis Z2-Z2 of the second reflection surfaces 8, may be made either equal or shifted from each other vertically or horizontally.

The lamp lenses are arranged on the light (lights LR1 shown in FIG. 3 and FIG. 4) reflection direction (optical axis Z1-Z1)-side of the four vertical first reflection surfaces 8 (81, 82, 83, and 84) and on the light (lights LR2 shown in FIG. 4) reflection direction (optical axis Z2-Z2)-side of the four vertical second reflection surfaces 9 (91, 92, 93, and 94). The lamp lenses are ones that serve as a common light emission area and that include the inner lens 4 and the outer lens 5 Which transmits lights almost as they progress. The inner lens 4 is arranged. As for the inner lens 4, four concave portions 42 recessed on the opposite side to the four vertical first reflection surfaces 8 (81, 82, 83, and 84) are formed in portions almost corresponding to ranges in which reflected lights (lights LR1 shown in FIG. 3 and FIG. 4) from the four vertical first reflection surfaces 8 (81, 82, 83, and 84) are incident, respectively.

In addition, as for the inner lens 4, four convex portions 43 projected on the four vertical second reflection surfaces 9 (91, 92, 93, and 94)-side are provided in portions almost corresponding to ranges in which reflected lights (lights LR2 shown in FIG. 4) from the four vertical second reflection surfaces 9 (91, 92, 93, and 94) are incident, respectively. The four concave portions 42 and four convex portions 43 of the inner lens 4 are alternately provided in the common area to the first reflection surfaces 8 and the second reflection surfaces 9 over almost its entirely surface to correspond to the four vertical first reflection surfaces 8 (81, 82, 83, and 84) and the four vertical second reflection surfaces 9 (91, 92, 93, and 94), respectively. The common area to the first reflection surfaces 8 and the second reflection surfaces 9 correspond to the common light emission area (indicated by slant lines in FIG. 11 and FIG. 12) to the lamp lenses (the inner lens 4 and the outer lens 5).

Alternatively, the concave portions 42 and the concave portions 43 may be provided oppositely. That is, the convex portions 42 may be provided in the portions of the inner lens 4 almost corresponding to the ranges in which the reflected lights LR1 from the four vertical first reflection surfaces 8 (81, 82, 83, and 84) are incident and the concave portions 43 may be provided in the portions thereof almost corresponding to the ranges in which the reflected lights LR2 from the four vertical second reflection surfaces 9 (91, 92, 93, and 94) are incident, respectively.

Vertical horizontal walls that are boundaries between the four concave portions 42 and the four convex portions 43 almost correspond to the first boundary 31 to the ninth boundary 39 that are boundaries between the four vertical first reflection surfaces 8 (81, 82, 83, and 84) and the four vertical reflection surfaces 9 (91, 92, 93, and 94), respectively. That is, the first to ninth boundaries 31 to 39 are almost located on extensions of the horizontal walls, respectively.

As illustrated in FIG. 1 to FIG. 4, six cylindrical light diffusion prism elements (so-called horizontal barrel prisms) 44 having horizontal axes are provided on each of outer surfaces of the four concave portions 42 of the inner lens 4 (surfaces facing the outer lens 5 or surfaces opposite to the first reflection surfaces 8). As illustrated in FIG. 1 to FIG. 4, two cylindrical light diffusion prism elements (so-called horizontal barrel prisms) 45 having horizontal axes are provided on each of outer surfaces of the four convex portions,43 of the inner lens 4. The shape of the light diffusion prism elements may be other than the cylindrical shape. In addition, one or a plurality of cylindrical light diffusion prism elements (so-called longitudinal barrel prisms) 46 or 47 having vertical axes may be provided on each of inner surfaces of the four concave portions 42 and the four convex portions 43 or each of either the four concave portions 42 or the four convex portions 43 of the inner lens 4 (surfaces opposite to the outer lens 5 or surfaces facing both or one of the first reflection surfaces and the second reflection surfaces 9). Conversely, vertical barrel prisms 46 or 47 may be provided on outer surfaces of the concave portions 42 and horizontal barrel prisms 44 and 45 may be provided on inner surfaces of the concave portions 42 and the convex portions 43. Further, no horizontal barrel prisms 44 and 45 and vertical barrel prisms 46 and 46 may be provided on the outer and inner surfaces of the concave portions 42 and the convex portions 43.

The tail and stop lamp 1 functions as follows. If a light switch (not illustrated), for example, is turned on, each first LED 6 emits lights. When the light switch is turned on, as illustrated in FIG. 3, the lights L1 from the first LED 6 are transmitted by the first linear Fresnel prism element group 40 almost as they progress and incident on the four vertical first reflection surfaces 8 (81, 82, 83, and 84), respectively. As illustrated in FIG. 9, the lights L1 from each first LED 6 are refracted and transmitted by the first Fresnel prism element 40 and incident, as almost parallel lights LH1, on the four vertical first reflection surfaces 8 (81, 82, 83, and 85). The lights L1 and LH1 incident on the four vertical first reflection surfaces 8 (81, 82, 83, and 84) are reflected, as reflected lights LR1 almost parallel to the optical axis Z1-Z1, in the inner lens 4 and the outer lens 5 by the four vertical first reflection surfaces 8 (81, 82, 83, and 84). The reflected lights almost parallel to the optical axis Z1-Z1 are transformed to four vertical light fluxes corresponding to the four vertical first reflection surfaces 8 (81, 82, 83, and 84). The four vertical reflected lights LR1 almost parallel to the optical axis Z1-Z1 are transmitted by the four vertical concave portions 42 of the inner lens 4 and vertically diffused by the light diffusion prism element group 44, respectively. The reflected lights LR1 thus vertically diffused are transmitted by the outer lens 5 and illuminated to the outside.

At this time, if the tail and stop lamp 1 that is the vehicle lamp according to the first embodiment is viewed from the front surface (vehicle rear side B), four portions (indicated by slant lines in FIG. 11) that almost correspond to the four vertical concave portions 42 of the inner lens 4 and the four vertical first reflection surfaces 8 (81, 82, 83, and 84) emit lights in the form of horizontal stripes in the common light emission area to the lamp lenses (the inner lens 4 and the outer lens 5) as illustrated in FIG. 11. The first LED 6 is a light emission source that emits red lights for tail and stop. Therefore, if the first LED 6 emits lights, the tail and stop lamp 1 emits red lights in the four horizontal strip portions, thus functioning as a tail lamp.

In addition, if a brake switch (not illustrated) is turned on while the light switch (not illustrated) is turned on each second LED 7 emits lights while each first LED 6 emits lights. If so, the lights L1 emitted from the first LED 6 are transmitted, as the reflected lights LR1, by the outer lens 5 and illuminated to the outside as explained above. On the other hand, as illustrated in FIG. 4, the lights L2 from the second LED 7 are transmitted by the second linear Fresnel prism element group 41 almost as they progress and incident on the four vertical second reflection surfaces 9 (91, 92, 93, and 94). In addition, as illustrated in FIG. 10, the lights L2 from the second LED 7 are refracted and transmitted by the second linear Fresnel prism element group 41, and incident, as almost parallel lights LH2, on the four vertical second reflection surfaces 9 (91, 92, 93, and 94).

The lights L2 and LH2 incident on the four vertical second reflection surfaces 9 (91, 92, 93, and 94) are reflected, as reflected lights LR2 almost parallel to the optical axis Z2-Z2, in the inner lens 4 and the outer lens 5 by the four vertical second reflection surfaces 9 (91, 92, 93, and 94). The reflected lights LR2 almost parallel to the optical axis Z2-Z2 are transformed to four vertical light fluxes corresponding to the four vertical second reflection surfaces 9 (91, 92, 93, and 94). The four vertical reflected lights LR2 almost parallel to the-optical axis Z2-Z2 are transmitted by the four vertical convex portions 43 of the inner lens 4 and vertically diffused by the light diffusion prism element group 45. The reflected lights LR2 thus vertically diffused are transmitted by the outer lens 5 and illuminated to the outside.

At this time, if the tail and stop lamp 1 that is the vehicle lamp according to the first embodiment is viewed from the front surface (vehicle rear side B), the common light emission area to the lamp lenses (the inner lens 4 and the outer lens 5) emits lights over its entire surface (portions indicated by slant lines in FIG. 12 are the light emission area of the inner lens 4 and the outer lens 5). Namely, if the second LED 7 emits lights, similarly to the emission of lights by the first LED 6, four portions that almost correspond to the four vertical convex portions 43 of the inner lens 4 and the four vertical second reflection surfaces 9 (91, 92, 93, and 94) emit lights in the form of horizontal stripes.

The four horizontal stripe light emission sections (indicated by reference symbols 43, 9, 94; 43, 9, 93; 43, 9, 92; and 43, 9, 94 in FIG. 12) by the emission of lights by the second LED 7 and the four horizontal strip light emission sections (indicated by reference symbols 42, 8, 81; 42, 8, 82; 42, 8, 83; and 42, 8, 84 in FIG. 12) by the emission of lights by the first LED 6 are combined, whereby the inner lens 4 and the outer lens 5 emit lights over their entire surfaces. The first LED 6 is the light emission source that emits red lights for tail and stop and the second LED 7 is the light emission source that emits red lights for stop. Therefore, if the first LED 6 emits lights, the tail and stop lamp 1 emit red lights over its entire surface, thus functioning as a stop lamp.

The tail and stop lamp 1 provides following advantages. In the tail and stop lamp 1, if each first LED 6 emits lights, the lights L1 and LH1 from this first LED 6 are reflected in the lamp lenses (the inner lens 4 and the outer lens 5) by the four vertical first reflection surfaces 8 (81, 82, 83, and 84) respectively formed out of parts of the rotational paraboloids F11, F12, F13, and F14. Therefore, the four reflected lights LR1 of light fluxes almost parallel to the optical axis Z1-Z1 of the first reflection surfaces 8 are obtained and the reflected lights LR1 are incident on the lamp lenses (the inner lens 4 and the outer lens 5). As a result, if the vehicle lamp is viewed from the outside, the four portions (42, 8, 81; 42, 8, 82; 42, 8, 83; and 42, 8, 84 shown in FIG. 11) in the common light emission area to the lamp lenses (the inner lens 4 and the outer lens 5) emit lights in the form of horizontal stripes. Therefore, the lightening of the lamp is made conspicuous, which can let drivers of other vehicles and people around the vehicle to which the vehicle lamp 1 is installed recognize the presence of the lamp 1, and which is preferable for traffic safety.

Similarly to the first LED 6, if each second LED 7 of the tail and stop lamp 1 that is the vehicle lamp according to the first embodiment emits lights the lights L2 and LH2 from this second LED 7 are reflected in the lamp lenses (the inner lens 4 and the outer lens 5) by the four vertical second reflection surfaces 9 (91, 92, 93, and 94) respectively formed out of parts of the rotational paraboloids F21, F22, F23, and F24. Therefore, the four reflected lights LR2 of light fluxes almost parallel to the optical axis Z2-Z2 of the second reflection surfaces 9 are obtained and the reflected lights LR2 are incident on the lamp lenses (the inner lens 4 and the outer lens 5). As a result, if the vehicle lamp is viewed from the outside, the four portions in the common light emission area to the lamp lenses (the inner lens 4 and the outer lens 5) emit lights in the form of horizontal stripes. Therefore, the lightening of the lamp is made conspicuous, which can let drivers of other vehicles and people around the vehicle to which the vehicle lamp is installed recognize the presence of the lamp, and which is preferable for traffic safety.

Besides, in the tail and stop lamp 1, if the first LEDs 6 and the second LEDs 7 emit lights simultaneously, the lights L1 and LH1 from each first LED 6 are incident on the four vertical first reflection surfaces 8 (81, 82, 83, and 84) and the lights L2 and LH2 from each second LED 7 are incident on the four vertical second reflection surfaces 9 (91, 92, 93, and 94). Therefore, in the tail and stop lamp 1, the bright part of the four vertical first reflection surfaces 8 (81, 82, 83, and 84) and the four vertical second reflection surfaces 9 (91, 92, 93, and 94) are generated but no dark part is generated in the common area, i.e., in the light emission sections (indicated by slant lines in FIG. 11 and FIG. 12) of the inner lens 4 and the outer lens 5. As can be seen, the tail and stop lamp 1 that is the vehicle lamp according to the first embodiment can obtain only the bright part in the common light emission area. Compared with the vehicle lamp in which both the bright part and the dark part are generated in the common light emission area, the outward appearance of the lamp 1 can be improved.

Notably, in the tail and stop lamp 1, the four vertical first reflection surfaces 8 (81, 82, 83, and 84) are formed out of parts of the rotational paraboloids F11, F12, F13, and F14 having a focus on the light emission source 61 of the first LED 6 and focal lengths f11, f12, f13, and f14 that are larger from up to down as the paraboloids are farther from the first LED 6, respectively. In addition, the vertical four second reflection surfaces 9 (91, 92, 93, and 94) are formed out of parts of the rotational paraboloids F21, F22, F23, and F24 having a focus on the light emission source 71 of the second LED 7 and focal lengths f21, f22, f23, and f24 that are larger as the paraboloids are farther from the second LED 7, respectively.

Therefore, in the tail and stop lamp 1, the lights L1 and LH1 from each first LED 6 which are the reflected lights LR1 reflected by the four vertical first reflection surfaces 8 (81, 82, 83, and 84) are obtained as the parallel lights in parallel to the optical axis Z1-Z1 of the first reflection surfaces 8. In addition, the lights L2 and LH2 from each second LED 7 which are the reflected lights LR2 reflected by the four vertical second reflection surfaces 9 (91, 92, 93, and 94) are obtained as the parallel lights in parallel to the optical axis Z2-Z2 of the second reflection surfaces 9. This can facilitate optical control over these reflected lights as parallel lights. For example, as shown in this embodiment, the light diffusion prism element groups 44 and 45 (46 and 47) can facilitate optical control for diffusing the reflected lights LR1 and LR2 as the parallel lights in a vertical (or horizontal) direction.

In the tail and stop lamp 1, the focal lengths of the four vertical first reflection surfaces 8 (81, 82, 83, and 84) are made larger as the surfaces are farther from the one first LED 6, whereby the four vertical first reflection surfaces 8 (81, 82, 83, and 84) are directed obliquely upward. For this reason, in the tail and stop lamp 1, when the first LED 6 emits no light such as, for example, at the daytime, an outside light (not illustrated) such as a solar light is transmitted by the outer lens 5 and the inner lens 4 and incident on and reflected by the four vertical first reflection surfaces 8 (81, 82, 83, and 84). Therefore, the tail and stop lamp 1 can give glittering and crystal impressions with high brightness. It is thereby possible to improve the commercial value of this tail and stop lamp 1. The four vertical by six right and left, i.e., a total of 24 first reflection surfaces 8 (81, 82, 83, and 84), in particular, enables the tail and stop lamp 1 to give glittering and crystal impressions with higher brightness and further improving the, commercial value of the lamp 1.

In the tail and stop lamp 1, the four vertical first reflection surfaces 8 (81, 82, 83, and 84) having different focal lengths f11, f12, f13, f14 and the four vertical second reflection surfaces 9 (91, 92, 93, and 94) having different focal lengths f21, f22, f23, and f24 are alternately provided. Therefore, inclination directions of the four vertical first reflection surfaces 8 (81, 82, 83, and 84) differ from one another. As a result, directions in which the outside light is reflected by the four vertical first reflection surfaces 8 (81, 82, 83, and 84) differ, thereby ensuring that the tail and stop lamp 1 that is the vehicle lamp according to the first embodiment gives glittering and crystal impressions with high brightness, accordingly.

In the tail and stop lamp 1, the six units each including the four vertical first reflection surfaces 8 (81, 82, 83, and 84) are arranged to be longitudinally shifted from one another as illustrated in FIG. 7. Therefore, the range in which the outside light is incident on the first reflection surfaces 8 (81, 82, 83, and 84) is wider than a range if the units are not arranged to be longitudinally shifted. It is thereby possible to further ensure that the tail and stop lamp 1 that is the vehicle lamp according to the first embodiment gives glittering and crystal impressions with high brightness.

If each of the four vertical first reflection surfaces 8 (81, 82, 83, and 84) is divided into two or more surfaces vertically, horizontally or obliquely, the outside light reflected by the four vertical first reflection surfaces 8 (81, 82, 83, and 84) enables the tail and stop lamp 1 that is the vehicle lamp according to the first-embodiment to give glittering and crystal impressions with high brightness.

Furthermore, in the tail and stop lamp 1, the outside light is reflected by the four vertical second reflection surfaces 9 (91, 92, 93, and 94) provided alternately with the four vertical first reflection surfaces 8 (81, 82, 83, and 84). Therefore, the synergistic effect with the glittering and crystal impressions given by the outside light reflected by the four vertical first reflection surfaces 8 (81, 82, 83, and 84) enables ensuring glittering and crystal impressions with higher brightness.

In the tail and stop lamp 1, by making the focal lengths of the four vertical first reflection surfaces 8 (81, 82, 83, and 84) larger as the surfaces are farther from the one first LED 6, the longitudinal width of the lamp 1 can be made small, as compared with the lamp in which the reflection surfaces having the same focal length are employed. Therefore, the vehicle lamp can be made small in size.

In the tail and stop lamp 1, four fluxes of the lights L1 and LH1, and the lights L2 and LH2 that are almost parallel reflected lights LR1 and LR2 are obtained by the four vertical first reflection surfaces 8 (81, 82, 83, and 84) formed out of parts of the rotational paraboloids F11, F12, F13, and F14 and the four vertical second reflection surfaces 9 (91, 92, 93, and 94) formed out of parts of the rotational paraboloids F21, F22, F23, and F24,.respectively. Therefore, the tail and stop lamp 1 can satisfactorily pursue the tail lamp function and the stop lamp function.

Notably, in the tail and stop lamp 1, the first linear Fresnel prism element group 40 is provided between each first LED 6 and the four vertical first reflection surfaces 8 (81, 82, 83, and 84). The first linear Fresnel prism element group 40 transmits the lights L1 from the first LED 6 almost as they progress in the cross section that includes the first LED 6 and the four vertical first reflection surfaces 8 (81, 82, 83, and 84), and refracts and transmits the lights from the first LED 6 as the almost parallel lights LH1 in the cross section orthogonal to the light reflection direction of the four vertical first reflection surfaces 8 (81, 82, 83, and 84). In addition, the second linear Fresnel prism element group 41 is provided between each second LED 7 and the four vertical second reflection surfaces 9 (91, 92, 93, and 94). The second linear Fresnel prism element group 41 transmits the lights L2 from the second LED 7 almost as they progress in the cross section that includes the second LED 7 and the four vertical second reflection surfaces 9 (91, 92, 93, and 94), and refracts and transmits the lights from the second LED 7 as the almost parallel lights LH2 in the cross section orthogonal to the light reflection direction of the four vertical second reflection surfaces 9 (91, 92, 93, and 94).

In the tail and stop lamp 1, therefore, the lights L1 and L2 from the first LED 6 and the second LED 7 are refracted and transmitted by the first linear Fresnel prism element group 40 and the second Fresnel prism element group 41 and incident on the four vertical first reflection surfaces 8 (81, 82, 83, and 84) and the four vertical second reflection surfaces 9 (91, 92, 93, and 94), respectively. As a result, the tail and stop lamp 1 that is the vehicle lamp according to the first embodiment can effectively use the lights L1 and L2 from the first LED 6 and the second LED 7, as compared with the lap in which the lights L1 and L2 from the first LED 6 and the second LED 7 are incident on and reflected, as they progress, by the four vertical first reflection surfaces 8 (81, 82, 83, and 84) and the four vertical second reflection surfaces 9 (91, 92, 93, and 94) along the illumination direction (optical paths indicated by two-dot chain lines shown in FIG. 9 and FIG. 10).

Further, in the tail and stop lamp 1, the lights L1 and L2 from the first LED 6 and the second LED 7 are transmitted by the first linear Fresnel prism element group 40 and the second linear Fresnel prism element group 41 almost as they progress and incident on and reflected by the four vertical first reflection surfaces 8 (81, 82, 83, and 84) and the four vertical second reflection surfaces 9 (91, 92, 93, and 94), respectively in the cross section shown in FIG. 3 and FIG. 4. As a result, the tail and stop lamp 1 that is the vehicle lamp according to the first embodiment can effectively make the lights L1 and L2 from the first LED 6 and the second LED 7 each having standard directivity characteristics that a directional angle (a diffusion angle) of an illumination light is 30° to 35° with respect to the 0° axis (O1-O1, O2-O2, or O—O) and an illumination angle of the illumination light having a highest luminous intensity of 1.0 is 20° to 25° with respect to the 0° axis (O1-O1, O2-O2, or O—O) incident on the four vertical first reflection surfaces 8 (81, 82, 83, and 84) and the four vertical second reflection surfaces 9 (91, 92, 93, and 94), respectively and can use the incident lights L1 and L2.

That is, the tail and stop lamp 1 can effectively use the lights L1 and L2 from the first LED 6 and the second LED 7 by the four vertical first reflection surfaces 8 (81, 82, 83, and 84) and the four vertical second reflection surfaces 9 (91, 92, 93, and 94) arranged within ranges of illumination angles of the lights L1 and L2 from the first LED 6 and the second LED 7.

Moreover, in the tail and stop lamp 1, the four concave portions 42 are provided in portions of the inner lens 4 that almost correspond to the ranges in which the reflected lights LR1 from the four vertical first reflection surfaces 8 (81, 82, 83, and 84) are incident and the four convex portions 43 are provided in portions of the inner lens 4 that almost correspond to the ranges in which the reflected lights LR2 from the four vertical second reflection surfaces 9 (91, 92, 93, and 94) are incident. The four concave portions 42 and the four convex portions 43 are alternately provided in the inner lens 4 and the outer lens 5 in the common area on almost their entire surfaces.

Accordingly, as illustrated in FIG. 3 and FIG. 11, the ranges of the reflected lights LR1 from the four vertical first reflection surfaces 8 (81, 82, 83, and 84) almost correspond to the four convex portions 42 of the inner lens 4, respectively. Therefore, the outlines of the four horizontal stripe light emission ranges in the inner lens 4 and the outer lens 5 (the ranges 42, 8, 81; 42, 8, 82; 42, 8, 83; and 42, 8, 84 indicated by slant lines shown in FIG. 11) are clear, ensuring that lightening of the lamp 1 as the tail lamp is conspicuous. As a result, the tail and stop lamp 1 that is the vehicle lamp according to the first embodiment can let a driver of a vehicle following the vehicle to which the tail and stop lamp 1 is installed and people around the vehicle recognize the presence of the tail lamp, which is preferable for traffic safety.

In the tail and stop lamp 1, the four vertical first reflection surfaces 8 (81, 82, 83, and 84) almost corresponding to the four concave portions 42 of the inner lens are formed out of parts of the rotational paraboloids F11, F12, F13, and F14 having a focus on the light emission source 61 of one first LED 6. This can ensure making the four reflected lights LR1, reflected by the four vertical first reflection surfaces 8 (81, 82, 83, and 84) and parallel to the optical axis Z1-Z1, incident on the corresponding four concave portions 42 of the inner lens 4, respectively. As a result, the outlines of the four horizontal stripe light emission ranges in the inner lens 4 and the outer lens 5 (the ranges 42, 8, 81; 42, 8, 82; 42, 8, 83; and 42, 8, 84 indicated by slant lines shown in FIG. 11) are clearer, thereby ensuring that lightening of the lamp 1 as the tail lamp is more conspicuous.

Further, in the tail and stop lamp 1, the four vertical first reflection surfaces 8 (81, 82, 83, and 84) of each of the six units are linearly connected horizontally. Therefore, as illustrated in FIG. 11, four horizontally linear light emission stripes having clear outlines can be obtained. By forming the light emission stripes into curves or vertically or obliquely checkerwise, the degree of freedom for the light emission design further increases.

Besides, in the tail and stop lamp 1, the six units each including the four vertical first reflection surfaces 8 (81, 82, 83, and 84) and the four vertical second reflection surfaces 9 (91, 92, 93, and 94) are longitudinally shifted from one another. Therefore, the degree of freedom for the light emission design, such as the ranges and shapes of the light emission sections in the inner lens 4 and the outer lens 5, and that for the light distribution design in the inner lens 4 and the outer lens 5 increase.

In the tail and stop lamp 1, by changing the optical axes Z1-Z1 and Z2-Z2 of the four vertical first reflection surfaces 8 (81, 82, 83, and 84) and the four vertical second reflection surfaces 9 (91, 92, 93, and 94), the reflection directions of the eight almost parallel reflected lights LR1 and LR2 are changed, respectively. Therefore, the degree of freedom for the light emission design (ranges and shapes of the light emission sections in the inner lens 4 and the outer lens 5) and that for the light distribution design in the inner lens 4 and the outer lens 5 further increase.

In the tail and stop lamp 1, the outer lens 5 transmits lights almost as they progress. Therefore, there is no fear of lessening the glittering impression when each first LED 6 emits no light.

Furthermore, in the tail and stop lamp 1, the light diffusion prism element groups 44 and 45 (46 and 47) provided on the outer surfaces or inner surfaces of the concave portions 42 and the convex portions 43 of the inner lens 4 can enlarge the light emission sections in the inner lens 4 and the outer lens 5 and make the light emission sections uniformly emit lights. As a result, the lightening of the tail and stop lamp 1 is more conspicuous.

In the tail and stop lamp 1, the 0° axes (O1-O1 and O2-O2) of the first LED 6 and the second LED 7 are inclined toward the first reflection surfaces 8 and the second reflection surfaces 9 relative to the optical axes Z1-Z1 and Z2-Z2, respectively. As a result, in the tail and stop lamp 1, the illumination angles of the lights L1 and L2 illuminated from the first LED 6 and the second LED 7 onto the four vertical first reflection surfaces 8 (81, 82, 83, and 84) and the four vertical second reflection surfaces 9 (91, 92, 93, and 94) almost coincide with the illumination angles of the illumination lights onto the first LED 6 and the second LED 7 having the highest luminous intensities. Therefore, the light emission efficiencies of the first LED 6 and the second LED 7 are improved.

FIG. 14 to FIG. 20 illustrate a vehicle lamp according to a second embodiment of the present invention. The second embodiment relates to a stop lamp 100, which is an example of the vehicle lamp.

The stop lamps 100 are installed on left and right sides in the rear portion of a vehicle (not illustrated), respectively. The stop lamp 100 illustrated by FIG. 14 to FIG. 20 is installed on the right of the rear portion of the vehicle. The stop lamp 100 includes a lamp housing 200, lamp lenses serving as a common light emission area, i.e., an inner lens 300 and an outer lens 400, and a plurality of LEDs 500 serving as light sources.

Figure 14:
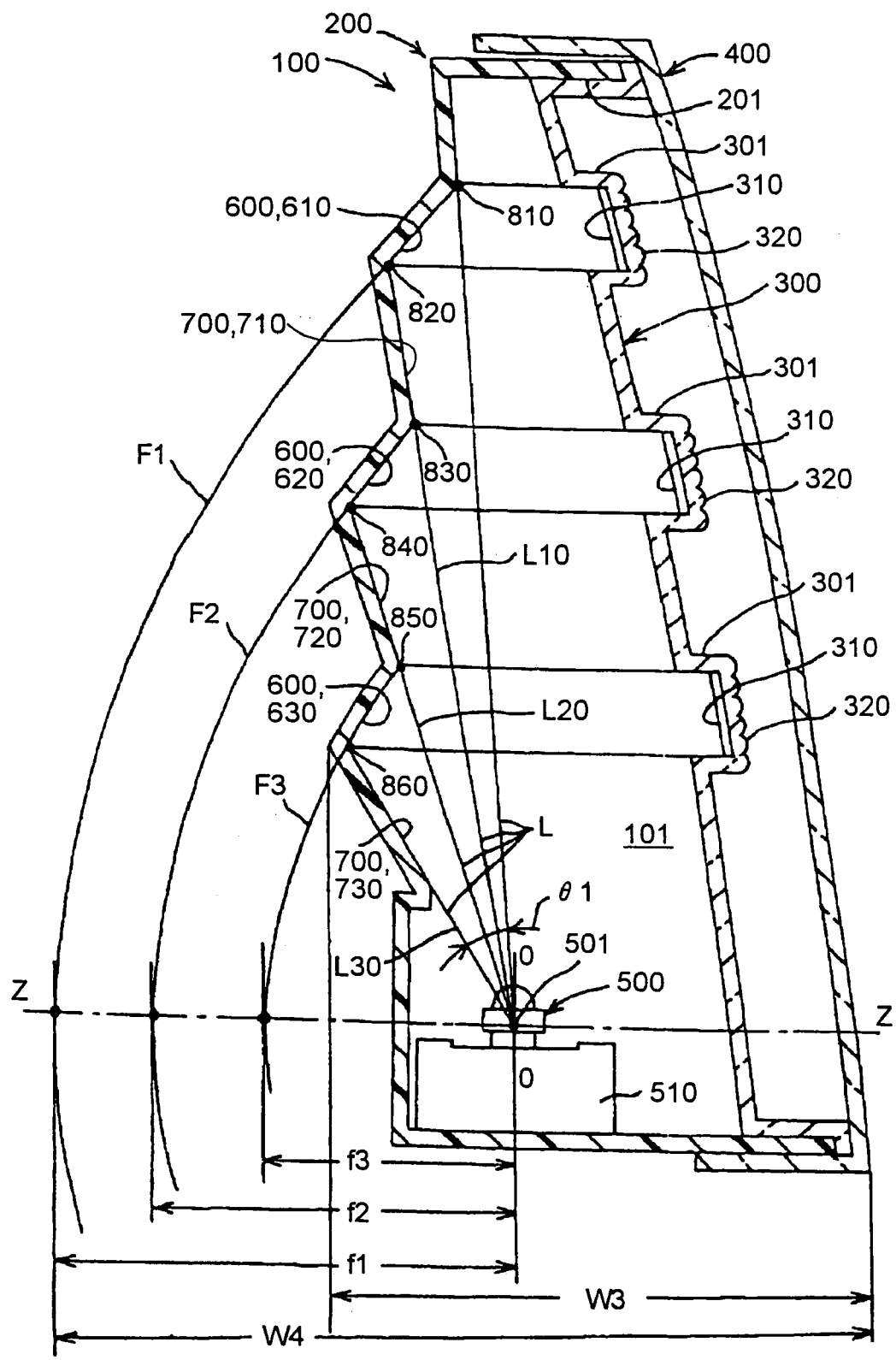
FIG. 14 is a longitudinal sectional view of a vehicle lamp according to a second embodiment the present invention and specifically illustrates a cross-section along a line XIV-XIV of FIG. 16.
Figure 15:
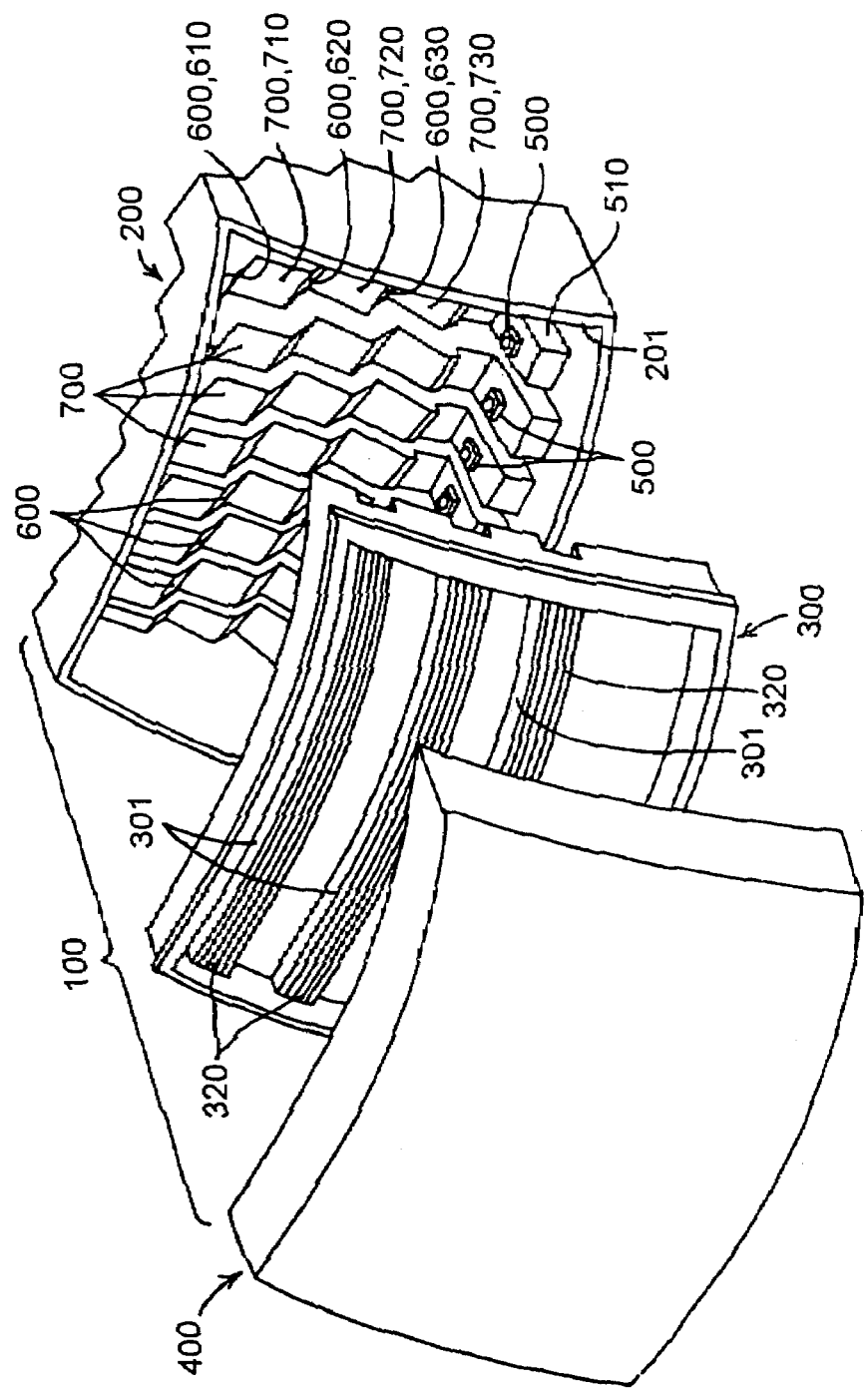
FIG. 15 is an exploded perspective view of a lamp housing, the inner lens, and the outer lens in the second embodiment.
Figure 16:
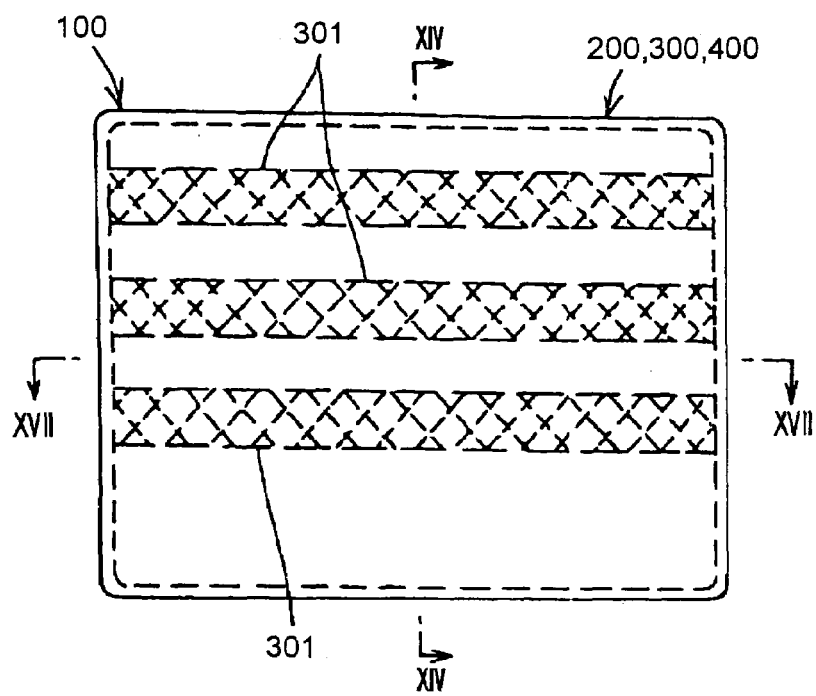
FIG. 16 is a front view of the vehicle lamp when the LEDs emit lights in the second embodiment.
Figure 17:
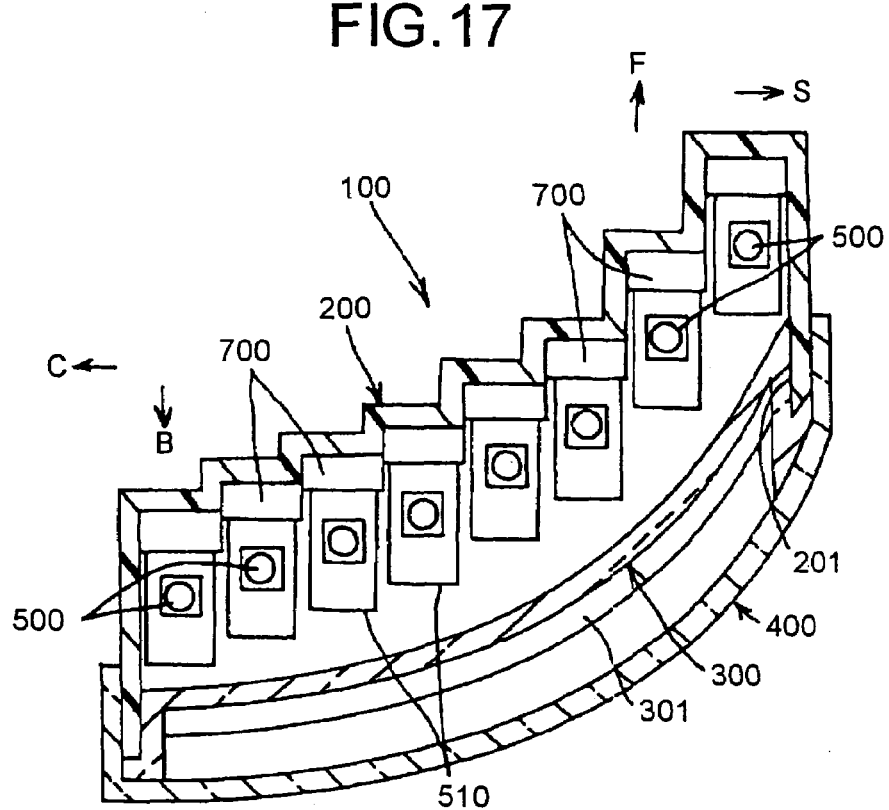
FIG. 17 is a cross-section along a line XVII-XVII of FIG. 16.

The lamp housing 200 is made of, for example, a synthetic resin. As illustrated in FIG. 14 to FIG. 17, this lamp housing 200 has a hollow rectangular parallelepiped structure in which a front surface 201 is opened and peripheral edges and a rear portion are closed. The rear portion of this lamp housing 200 has three shelves in a vertical direction (which direction is a vertical direction when this stop lamp 100 is installed to the vehicle, hereinafter, "vertically" or "vertical direction") as illustrated in FIG. 14, and eight shelves in a lateral direction (which is a horizontal direction when this stop lamp 100 is installed to the vehicle, hereinafter, "horizontally" or "horizontal direction") as illustrated in FIG. 17.

An inner surface of the lamp housing 200 is deposited with aluminum or coated with silver. As a result, a reflection surface 600 and a mirror finished surface 700 of a mirror block are provided on each of the three vertical shelves and the eight horizontal shelves, i.e., 24 shelves in all on the inner surface of the rear portion of the lamp housing 200. The 24 reflection surfaces 600 and the 24 mirror finished surfaces 700 are alternately arranged by threes vertically and eights horizontally and almost linearly. Only the reflection surfaces 600 and the mirror finished surfaces 700 on the inner surface of the lamp housing 200 may be deposited with aluminum or coated with silver. Further, by alternately providing the mirror finished surfaces 700 to put each reflection surface 600 between the two mirror finished surfaces 700, the mirror finished surfaces 700 may be provided by fours vertically.

The reflection surfaces 600 reflect lights L1 from the LEDs 500 in the lamp lenses (the inner lens 300 and the outer lens 400). Each of the reflection surfaces 600 is formed out of a part of a rotational paraboloid. That is, as illustrated in FIG. 14, the three vertical reflection surfaces 600 (610, 620, and 630) are formed out of parts of rotational paraboloids F1, F2, and F3 having a focus on a light emission source 501 (which is regarded as a generally point light source) of each LED 500 and focal lengths f1, f2, and f3 that are larger from up to down (as the paraboloids are farther from the LED 500), respectively. The three vertical reflection surfaces 600 (610, 620, and 630) means the three vertical reflection surfaces 600 (610, 620, and 630) in each of eight rows. This shall apply hereafter.

The three vertical reflection surfaces 600 (610, 620, and 630) are arranged almost within a range of an illumination angle θ1 of the lights from the LED 500. It is noted that the range of the illumination angle θ1 almost coincides with a range of a directional angle (diffusion angle) of the LED 500 to be explained later. In addition, directions of optical axes Z-Z of the three vertical reflection surfaces 600 (610, 620, and 630) almost coincide with one another. Alternatively, the three vertical reflection surfaces 600 (610, 620, and 630) may have optical axes different in direction.

The mirror finished surfaces 700 of the mirror blocks do not function to reflect the lights L from the LED 500 but reflect an outside light LO incident thereon from the outer lens 400 and the inner lens 300. As illustrated in FIG. 14, the three vertical mirror finished surfaces 700 (710, 720, and 730) of the mirror blocks are arranged on segments L10, L20, and L30 that connect the light emission source 510 of the LED 500 to boundaries 810, 820, 830, 840, 850, and 860 between the three vertical reflection surfaces 600 (610, 620, and 630) and the three vertical mirror finished surfaces 700 (710, 720, and 730), respectively. As a result, the mirror finished surfaces do not function to reflect the lights L from the light emission source 501 of the LED 500. The three vertical mirror finished surfaces 700 (710, 720, and 730) means the three vertical mirror finished surfaces 700 (710, 720, and 730) in each of eight rows. This shall apply hereafter. It is noted that the mirror finished surfaces 700 are sometimes arranged vertically by fours by alternately providing the mirror finished surfaces 700 to put each reflection surface 600 between the two mirror finished surfaces 700. In other words, one mirror finished surface is sometimes arranged upward of the first reflection surfaces 600 (610) from the top.

Steps of forming the three reflection surfaces 600 (610, 620, and 630) and the three mirror finished surfaces 700 (710, 720, and 730) vertically, alternately arranged will next be explained with reference to FIG. 14. The upper boundary 810 of the first reflection surface 600 (610) from the top is arbitrarily set first. The first rotational paraboloid F1 passing the boundary 810, and having a focus on the light emission source 501 of the LED 500 and the focal length f1 is formed. The lower boundary 820 of the first reflection surface 600 (610) from the top is arbitrarily set. If so setting, the first reflection surface 600 (610) from the top is formed. The lower boundary 720 is connected to the light emission source 601 of the LED 500 by the first segment L10. On the first segment L10, the upper boundary 830 of the second reflection surface 600 (620) from the top is arbitrarily set. If so setting, the first mirror finished surface 700 (710) from the top is created. Likewise, the second reflection surface 600 (620), the second mirror finished surface 700 (720), the third reflection surface 600 (630), the third mirror finished surface 700 (730) from the top are formed thereafter. In FIG. 14, reference symbol 850 denotes an upper boundary, 840 and 860 denote lower boundaries, L20 denotes the second segment, and L30 denotes the third segment.

The inner lens 300 is made of, for example, a light transmittable synthetic resin. This inner lens 300 is shaped to cover a front opening 201 of the lamp housing 200. In addition, convex portions 301 projected on the outer lens 400 side are provided in portions of the inner lens 300 almost corresponding to ranges in which reflected lights LR from the reflection surfaces 600 are incident, respectively. The convex portions 301 may be concave portions recessed on the outer lens 400 side. The convex portions 301 are almost linear horizontally and three convex portions 301 are provided vertically. Inner surfaces of upper and lower sidewalls of each convex portion 301 almost correspond to each reflection surface 600. That is, as illustrated in FIG. 14, the upper boundary and lower boundary of each reflection surface are almost located on extensions of the inner surfaces of the upper and lower sidewalls of each convex portion 301, respectively.

A cylindrical light diffusion prism element group 310 having a vertical axis is provided on inner surfaces of the convex portions 301 of the inner lens 300 (on a surface opposite to the outer lens 400). A cylindrical light diffusion prism element group 320 having a horizontal axis is provided on outer surfaces of the convex portions 301 of the inner lens (on the outer lens 400-side surface). The light diffusion prism element groups may be of shapes other than the cylindrical shape.

Similarly to the inner lens 300, the outer lens 400 is made of, for example, a light transmittable synthetic resin. This outer lens 400 is shaped to cover the front opening 201 of the lamp housing 200 and the inner lens 300. The outer lens 400 transmits lights as they progress.

The LEDs 500 are arranged in a lamp chamber 101 defined by the lamp housing 200, the inner lens 300, and the outer lens 400. One LED 500 is arranged for the three reflection surfaces 600 (610, 620, and 630) and the three mirror finished surfaces 700 (710, 720, and 730). Each LED 500 is attached to an LED attachment block 510, and electrically connected to a power supply (not illustrated) such as a battery. The LED 500 is attached so that a 0° axis is almost perpendicular to the optical axis Z-Z.

The three reflection surfaces 600 (610, 620, and 630), the three mirror finished surfaces 700 (710, 720, and 730), and one LED 500 constitute one unit. Therefore, the stop lamp 100 in this embodiment has eight units. As illustrated in FIG. 17, the eight units are arranged to be shifted from one another in a light reflection direction of the reflection surfaces 600 (a direction in which the lights L from the LEDs are reflected, i.e., a direction of the optical axis Z-Z and longitudinal direction of the vehicle). Namely, the vehicle center side C unit is arranged on a vehicle rear side B and the vehicle side S unit is arranged on a vehicle front side F.

Figure 13:
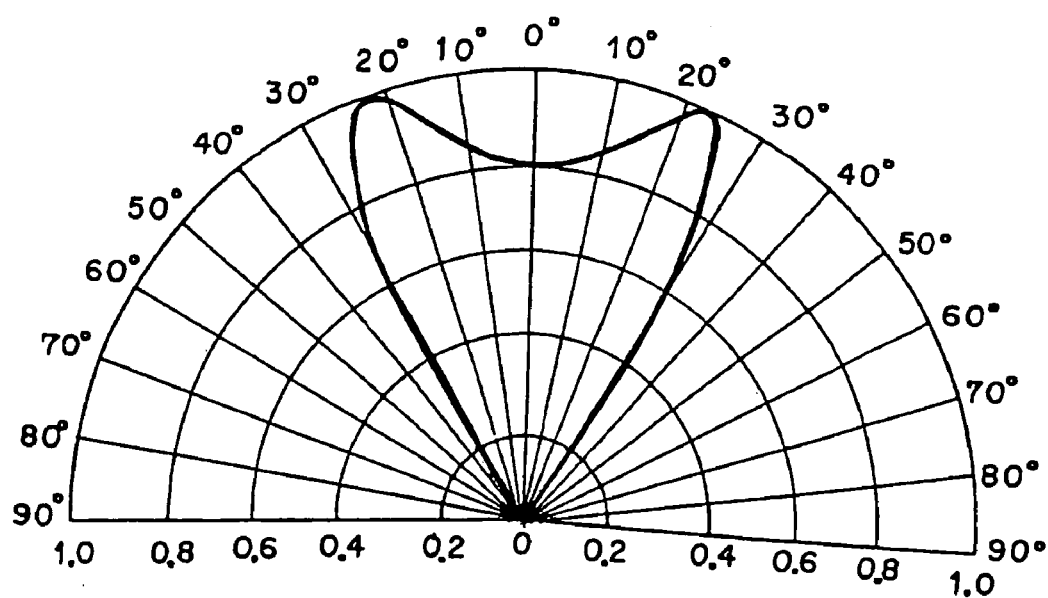
FIG. 13 is an explanatory view which illustrates standard directivity characteristic of an LED illumination light in the first embodiment.

As illustrated in FIG. 13, as the LEDs 500, LEDs having standard directivity characteristics that the directional angle (diffusion angle) of the illumination light (indicated by the thick solid line in FIG. 13) is 30° to 35° with respect to the 0° axis (O—O) and the illumination angle of the illumination light having the highest luminous intensity of 1.0 is 20° to 25° with respect to the 0° axis (O—O) are employed. That is, ordinary standard LEDs are employed as the LEDs 500. The directional angle is an angle formed between a segment that connects a point of the illumination light having a luminous intensity of 0.5 to a point thereof having a luminous intensity of 0 (light emission source) and the 0° axis (O—O) and exhibits directivity characteristics (half angle). The illumination angle of the illumination light having the highest luminous intensity of 1.0 is an angle formed between a segment that connects a point of the illumination light having the highest luminous intensity of 1.0 and a point thereof having the luminous intensity of 0 (light emission source) and the 0° axis (O—O).

The function of the stop lamp 100, which is the vehicle lamp according to the second embodiment and which is constituted as explained above, will next be explained.

Figure 19:
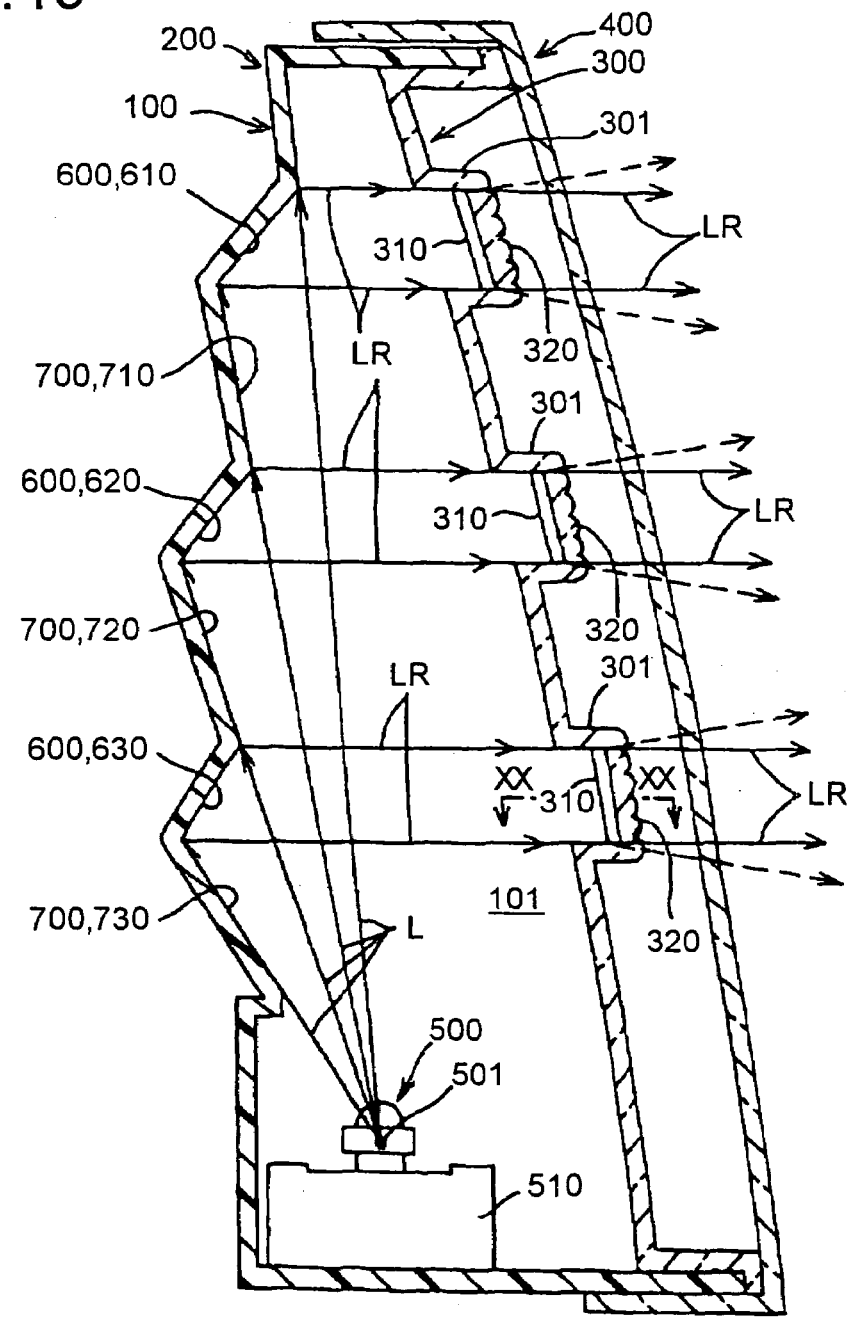
FIG. 19 is a longitudinal sectional view of a light emission state of an LED in the second embodiment.
Figure 20:
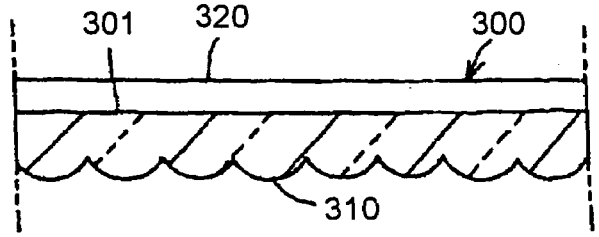
FIG. 20 is a cross-section along a line X-X of FIG. 19.

If a brake switch (not illustrated), for example, is turned on, each LED 500 emits lights. If so, the as illustrated in FIG. 19, lights L emitted from the LED 500 are incident on the three vertical reflection surfaces 600 (610, 620, and 630). The lights L incident on the three vertical reflection surfaces 600 (610, 620, and 630) are reflected, as reflected lights LR2 almost parallel to the optical axis Z-Z, in the lamp lenses (the inner lens 300 and the outer lens 400) by the three vertical reflection surfaces 600 (610, 620, and 630). The reflected lights LR almost parallel to the optical axis Z-Z are transformed to three vertical light fluxes corresponding to the three vertical reflection surfaces 600 (610, 620, and 630).

The three vertical reflected lights LR almost parallel to the optical axis Z-Z are transmitted by the three vertical convex portions 301 of the inner lens 300 and horizontally and vertically diffused by the light diffusion prism element groups 310 and 320. The reflected lights LR thus horizontally and vertically diffused are transmitted by the outer lens 400 and illuminated to the outside.

At this time, if the stop lamp 100 is viewed from the front surface (vehicle rear side B), three portions (portions of dotted line checkered) almost corresponding to the three vertical convex portions 301 of the inner lens 300 and the three vertical reflection surfaces 600 (610, 620, and 630), respectively emit lights in the form of horizontal stripes in the common light emission area to the lamp lenses (the inner lens 300 and the outer lens 4.00). The LED 500 is the light emission source that emits red lights for stop. Therefore, if the LED 500 emits lights, the three portions emit red lights in the form of horizontal stripes in the stop lamp 100, thus functioning as a stop lamp.

Advantages of the stop lamp 100, which is the vehicle lamp according to the second embodiment and which is constituted as explained above, will next be explained.

In the stop lamp 1 00, if each LED 500 emits lights, the lights L from the LED 500 is reflected in the lamp lenses (the inner lens 300 and the outer lens 400) by the three vertical reflection surfaces 600 (610, 620, and 630) respectively formed out of parts of the rotational paraboloids F1, F2, and F3. Therefore, the three reflected lights LR almost parallel to the optical axis Z-Z of the reflection surfaces 600 are obtained and the reflected lights LR are incident on the lamp lenses (the inner lens 300 and the outer lens 400). As a result, if the lamp is viewed from the outside, the three portions (the range 301 of dotted-line checkered patterns shown in FIG. 16) in the light emission area of the lamp lenses (the inner lens 300 and the outer lens 400) emits lights in the form of horizontal stripes. Therefore, the lightening of the lamp is made conspicuous, which can let drivers of other vehicles and people around the vehicle to which the vehicle lamp 100 is installed recognize the presence of the lamp 100, and which is preferable for traffic safety.

In the stop lamp 100, when the LED 500 emits lights, the lights L from the light emission source 501 of the LED 500 which source is regarded as a generally point light source) are not reflected by the three vertical mirror finished surfaces 700 (710, 720, and 720) of the mirror blocks. Therefore, these three vertical mirror finished surfaces 700 (710, 720, and 720) of the mirror blocks do not have any optical function to the lights L from the LED 500 and do not have any influence on a predetermined lamp function obtained by the three vertical reflection surfaces 600 (610, 620, and 630).

Figure 18:
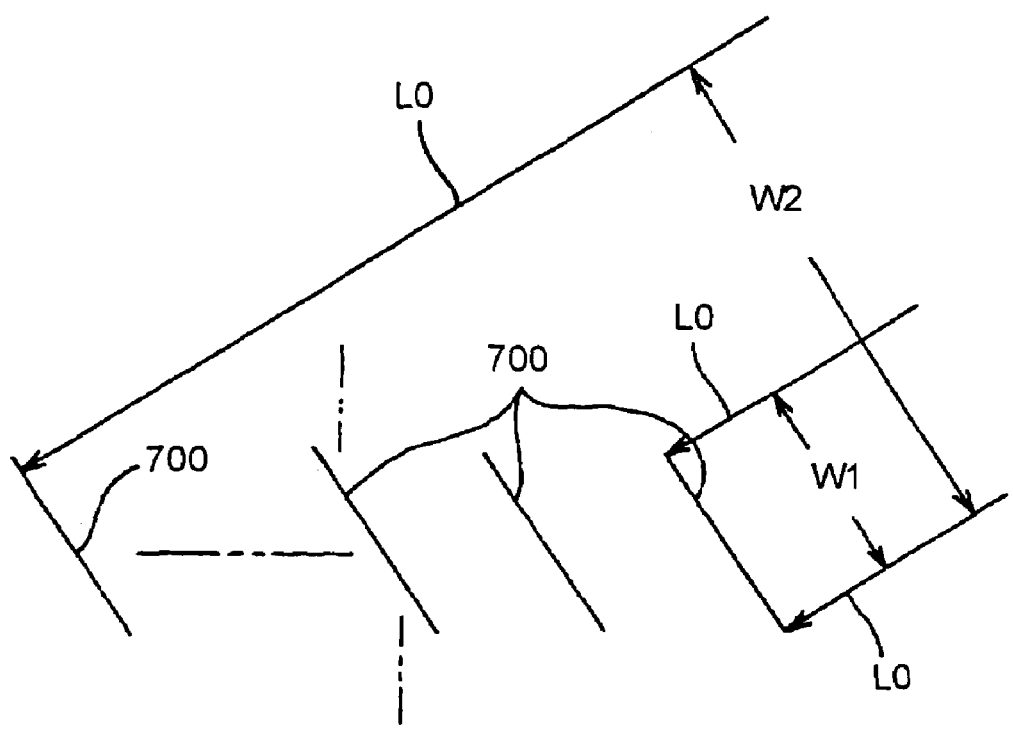
FIG. 18 is an explanatory view of a state in which an outside light is incident on mirror finished surfaces of eight units shifted from one another in a longitudinal direction of a vehicle in the second embodiment.

In the stop lamp 100, when the LED 500 emits no light, the outside light LO such as a solar light incident from the lamp lenses (the inner lens 300 and the outer lens 400) are reflected by the three vertical mirror finished surfaces 700 (710, 720, and 730) of the mirror blocks as illustrated in FIG. 18. Therefore, if the interior of the stop lamp 100 is viewed from the outside of the stop lamp 100 through the lamp lenses (the inner lens 300 and the outer lens 400), the stop lamp 100 gives glittering and crystal impressions with high brightness, thereby improving the commercial value of the lamp 100.

Notably, in the stop lamp 100, the three vertical mirror finished surfaces by eight horizontal mirror finished surfaces, i.e., 24 mirror finished surfaces 700 of the mirror blocks enable the stop lamp 100 to give glittering and crystal impressions with higher brightness, thereby making it possible to further improve the commercial value of the stop lamp 100.

In the stop lamp 100, the focal lengths f1, f2, and f3 of the three vertical reflection surfaces 600 (610, 620, and 630) are made larger as the surfaces are located at an upper position, whereby the three vertical mirror finished surfaces 700 (710, 720, and 730) of the mirror blocks are directed obliquely upward i.e., directed toward the outside light LO such as a solar light incident from the outer lens 400 and the inner lens 300. Therefore, the stop lamp 100 can give glittering and crystal impressions with higher brightness.

In the stop lamp 100, the three vertical reflection surfaces 600 (610, 620, and 630) having different focal lengths f1, f2, and f3 and the three vertical mirror finished surfaces 700 (710, 720, and 730) of the mirror blocks are alternately provided. Therefore, inclination directions of the three vertical mirror finished surfaces 700 (710, 720, and 730) differ from one another. As a result, directions in which the outside light LO is reflected by the three vertical mirror finished surfaces 700 (710, 720, and 730) differ, thereby ensuring that the stop lamp 100 gives glittering and crystal impressions with high brightness, accordingly.

In the stop lamp 100, the eight units each including the three vertical mirror finished surfaces 700 (710, 720, and 730) of the mirror blocks are arranged to be shifted from one another in the light reflection direction of the reflection surfaces (the longitudinal direction of the vehicle). Therefore, as illustrated in FIG. 18, a range W2 in which the outside light LO is incident on the mirror finished surfaces 700 (710, 720, and 730) is wider than a range W1 if the units are not shifted from one another. It is thereby possible to further ensure that the stop lamp 100 gives glittering and crystal impressions with high brightness.

Notably, in the stop lamp 100, the three vertical reflection surfaces 600 (610, 620, and 630) are formed out of parts of the rotational paraboloids F1, F2, and F3 having a focus on the light emission source 501 of the LED 500 and focal lengths f1, f2, and f3 that are larger as the paraboloids are farther from the LED 500, respectively. Therefore, in the stop lamp 100, the lights L from each LED 500 which are the reflected lights LR reflected by the three vertical reflection surfaces 600 (610, 620, and 630) are obtained as the parallel lights in parallel to the optical axis Z-Z of the reflection surfaces 600. This can, facilitate optical control over these reflected lights LR as parallel lights. For example, as shown in this embodiment, the light diffusion prism element groups 310 and 320 can facilitate optical control for diffusing the reflected lights LR as the parallel lights in horizontal and vertical directions.

The stop lamp 100 can sufficiently effectively use the lights L1 from the LED 500 by the three vertical reflection surfaces 600 (610, 620, and 630) arranged within the range of the illumination angle θ1 of the lights L from the LED 600.

Further, in the stop lamp 100, as illustrated in FIG. 19, the three lights L from the LED 500 that are almost parallel reflected lights LR are obtained by the three vertical reflection surfaces 600 (610, 620, and 630), respectively. Therefore, the stop lamp 100 can sufficiently pursue the lamp function (stop lamp function). The three reflected lights LR are almost in parallel to the optical axis Z-Z.

In the stop lamp 100, the eight units each including the three vertical reflection surfaces 600 (610, 620, and 630) are arranged to be shifted from one another in the light reflection direction of the reflection surfaces (the longitudinal direction of the vehicle). Therefore, a degree of freedom for a light emission design, such as the ranges and shapes of the light emission sections in the lamp lenses (the inner lens 300 and the outer lens 400), in the lamp lenses (the inner lens 300 and the outer lens 400), and that for a light distribution design increase.

Besides, in the stop lamp 100, by changing the optical axis direction of the three vertical reflection surfaces 600 (610, 620, and 630), the reflection direction of the three almost parallel reflected lights LR changes. Therefore, the degree of freedom for the light emission design (ranges and shapes of the light emission sections in the inner lens 300 and the outer lens 400) and that for the light distribution design in the inner lens 300 and the outer lens 400 further increase. Namely, in FIG. 14, the direction of the optical axis Z-Z of the three vertical reflection surfaces 600 (610,.620, and 630) (rotational axis of the rotational paraboloids F1, F2, and F3) is rotated clockwise or counterclockwise about the light emission source 501 of the LED 500 (focus of the rotational paraboloids F1, F2, and F3). If so, the optical axis direction of the three vertical reflection surfaces 600 (610, 620, and 630) changes (differs). As a result, the reflection direction of the three almost parallel reflected lights LR from the three vertical reflection surfaces 600 (610, 620, and 630) changes to an upward or downward direction of the optical axis Z-Z.

In the stop lamp 100, as illustrated in FIG. 14 and FIG. 19, the ranges of-the reflected lights LR from the reflection surfaces 600 almost correspond to the convex portions 301 of the inner lens 300, respectively. Therefore, the outlines of the light emission ranges of the inner lens 300 and the outer lens 400 (ranges of dotted line checkered patterns illustrated in FIG. 16) are clear, ensuring that lightening of the stop lamp 100 is conspicuous. As a result, the stop lamp 100 can let a driver of a vehicle following the vehicle to which the stop lamp 100 is installed and people around the vehicle recognize the presence of the stop lamp 100, which is preferable for traffic safety.

In the stop lamp 100, the three vertical reflection surfaces 600 (610, 620, and 630) of the eight units are linearly, horizontally connected. Therefore, as illustrated in FIG. 16, the three horizontally linear light emission stripes having clear outlines can be obtained. By forming the light emission strips into curves or vertically or obliquely checkerwise, the degree of freedom for the light emission design further increases.

Besides, in the stop lamp 100, the light diffusion prism element groups 310 and 320 provided on the inner and outer surfaces of the convex portions 301 of the inner lens 300 can enlarge the light emission ranges in the inner lens 300 and the outer lens 400 and, make the light emission ranges uniformly emit lights. As a result, the lightening of the tail and stop lamp 1 is more conspicuous. Namely, the reflected lights from the reflection surfaces 600 (610, 620, and 630) that are transmitted by the convex portions 301 of the inner lens 300 are diffused by the light diffusion prism element groups 310 and 320 as indicated by dotted-line arrows shown in FIG. 19. As a result, the light emission ranges in the inner lens 300 and the outer lens 400 are enlarged and the light emission ranges can be made uniform.

In the stop lamp 100, the outer lens 400 transmits lights as they progress. Therefore, there is no fear of lessening the glittering and crystal impressions when each first LED 500 emits no light.

Furthermore, in the stop lamp 100, the focal lengths f1, f2, and f3 of the three vertical reflection surfaces 600 (610, 620, and 630) are made larger as the reflection surfaces are located at upper positions. By doing so, as illustrated in FIG. 14, a width W3 of the light reflection direction of the reflection surfaces (direction of the optical axis Z-Z) in a width of this stop lamp 100 can set smaller than a width W4 if the reflection surfaces have the same focal length. It is thereby possible to make the stop lamp 100 smaller in size.

Figure 21:
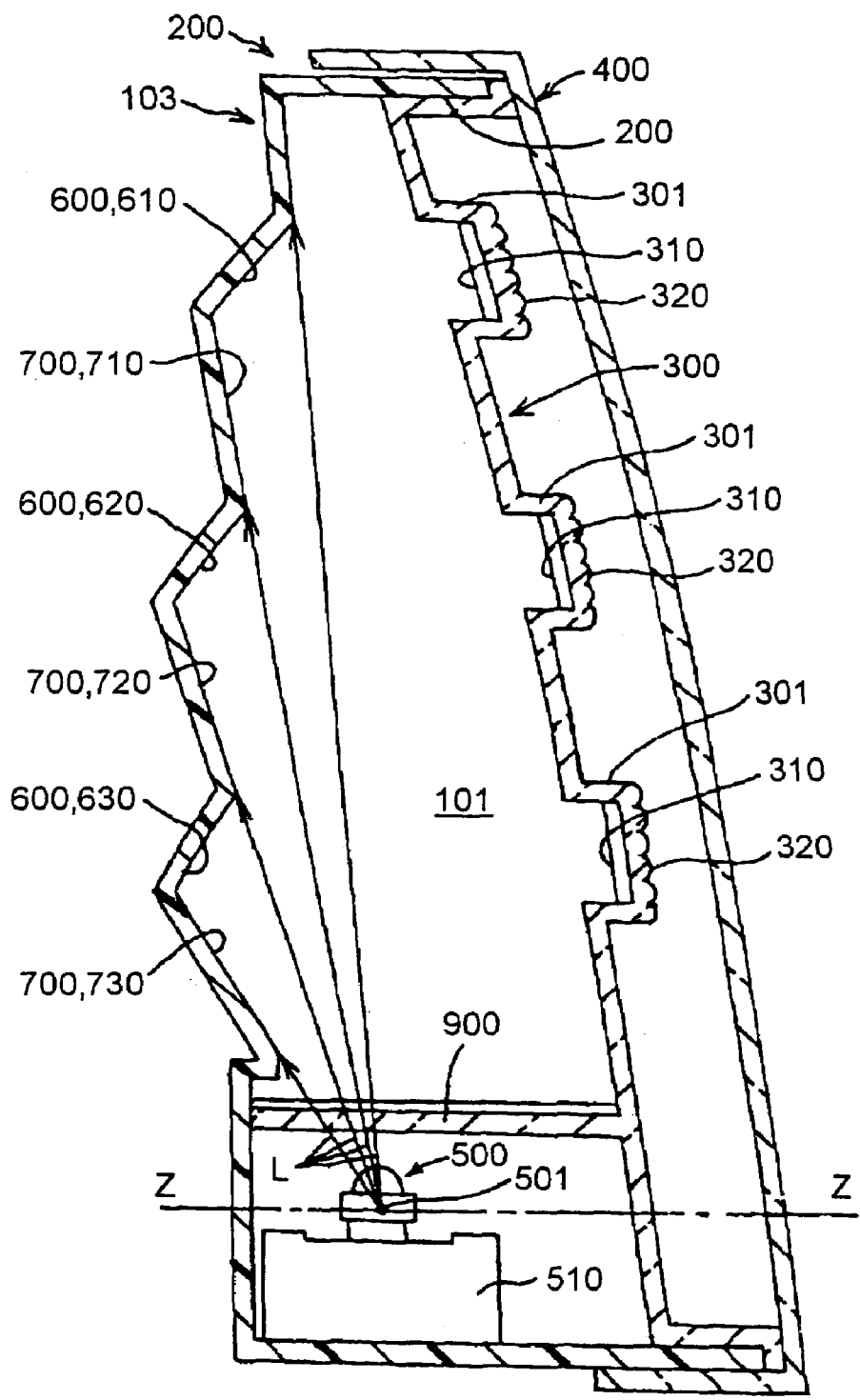
FIG. 21 is a longitudinal sectional view of a vehicle lamp according to a third embodiment the present invention.
Figure 22:
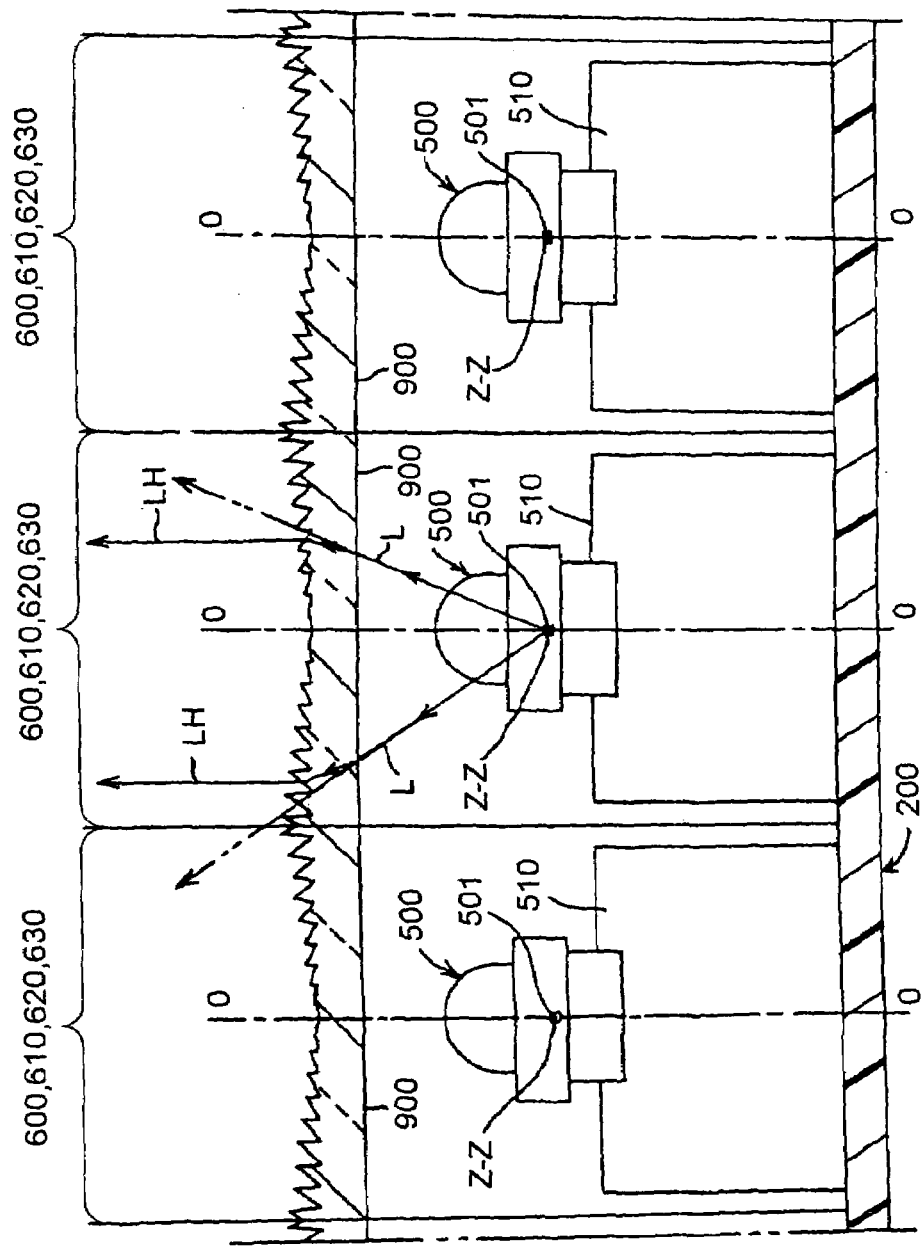
FIG. 22 is a partial cross-sectional view in the third embodiment.

FIG. 21 and FIG. 22 illustrate a vehicle lamp according to a third embodiment of the present invention. This third embodiment is a modification of the second embodiment. In FIG. 21 and FIG. 22, the same reference symbols as those in FIG. 14 to FIG. 20 denote the same constituent elements, respectively.

A stop lamp 103 that is the vehicle lamp according to the third embodiment has a linear Fresnel prism element group 900 between the LED 500 and the three vertical reflection surfaces 600 (610, 620, and 630). This linear Fresnel prism element group 900 transmits lights L from the LED 500 almost as they progress in the cross section (shown in FIG. 21) that includes the three vertical reflection surfaces 600 (610, 620, and 630), the three vertical mirror finished surfaces 700 (710, 720, and 730) of mirror blocks, and one LED 500. In addition, the linear Fresnel prism element group 900 refracts and transmits the lights L from the LED 500 as almost parallel lights LH in the cross section (shown in FIG. 22) orthogonal to the light reflection surface of the reflection surfaces 600 (the optical axis Z-Z).

The stop lamp 103 is constituted as explained above. Therefore, the stop lamp 103 can attain the following functions and advantages. Namely, in the stop lamp 103 the stop lamp 103, the lights L from the LED 500 are refracted and transmitted by the linear Fresnel element group 900 and incident, as the almost parallel lights LH, on the three vertical reflection surfaces 600 (610, 620, and 630). As a result, as compared with the vehicle lamp in which the lights L from the LED 500 are incident on and reflected by the reflection surfaces 600 along the illumination direction (on the optical paths indicated by two-dot chain-line arrows in FIG. 22), the stop lamp 103 can effectively use the lights L from the LED 500.

In the stop lamp 103the stop lamp 103, the lights L from the LED 500 are transmitted by the linear Fresnel element group 900 almost as they progress and incident on the three vertical reflection surfaces 600 (610, 620, and 630) in the cross section shown in FIG. 21. Therefore, there is no fear that the provision of the linear Fresnel prism element group 900 causes loss of the lights from the LED 500.

That is, the stop lamp 103 can use the lights L from the LED 500 having directivity characteristics that the directional angle (diffusion angle) of the illumination light is 30° to 35° with respect to the 0° axis (O1-O1, O2-O2, or O—O) and the illumination angle of the illumination light having the highest luminous intensity of 1.0 is 20° to 25° with respect to the 0° axis (O1-O1, O2-O2, or O—O) by making the lights L effectively incident on the three vertical reflection surfaces 600 (610, 620, and 630).

Figure 23:
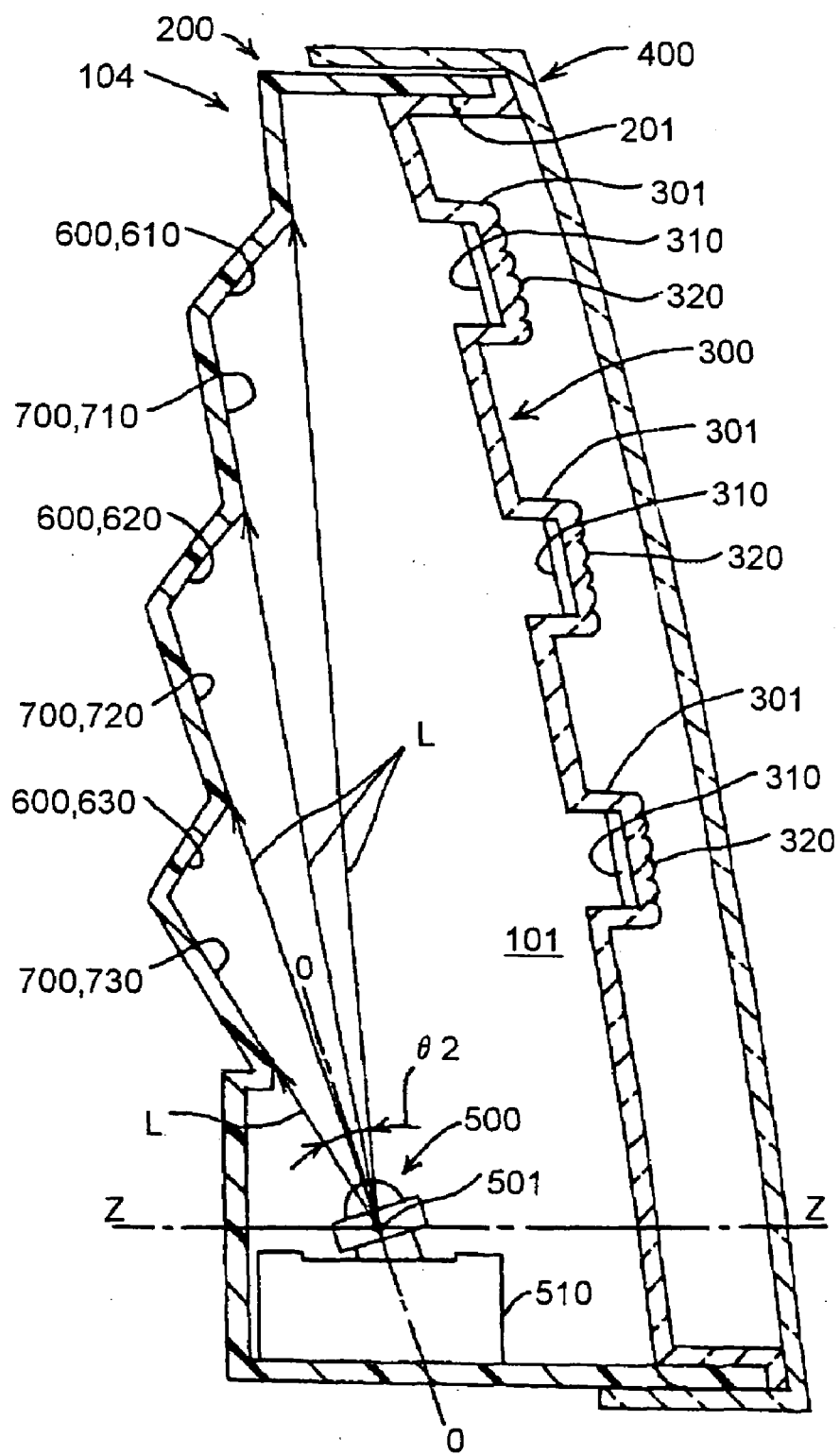
FIG. 23 is a longitudinal sectional view of a vehicle lamp according to a fourth embodiment the present invention.

FIG. 23 illustrates a vehicle lamp according to a fourth embodiment of the present invention: This fourth embodiment is a modification of the second embodiment. In FIG. 23, the same reference symbols as those in FIG. 14 to FIG. 22 denote the same constituent elements, respectively.

In a stop lamp 104 that is the vehicle lamp according to the fourth embodiment, the 0° axis (O—O) of the LED 500 is inclined toward the reflection surfaces 600-side relative to the optical axis Z-Z. By constituting the stop lamp 104, an illumination angle θ2 of the lights L illuminated from the LED 500 onto the three vertical reflection surfaces 600 (610, 620, and 630) almost corresponds to the illumination angle of the illumination light from the LED 500 having the highest luminous intensity of 1.0. Therefore, the light emission efficiency of the LED 500 is improved.

Figure 24:
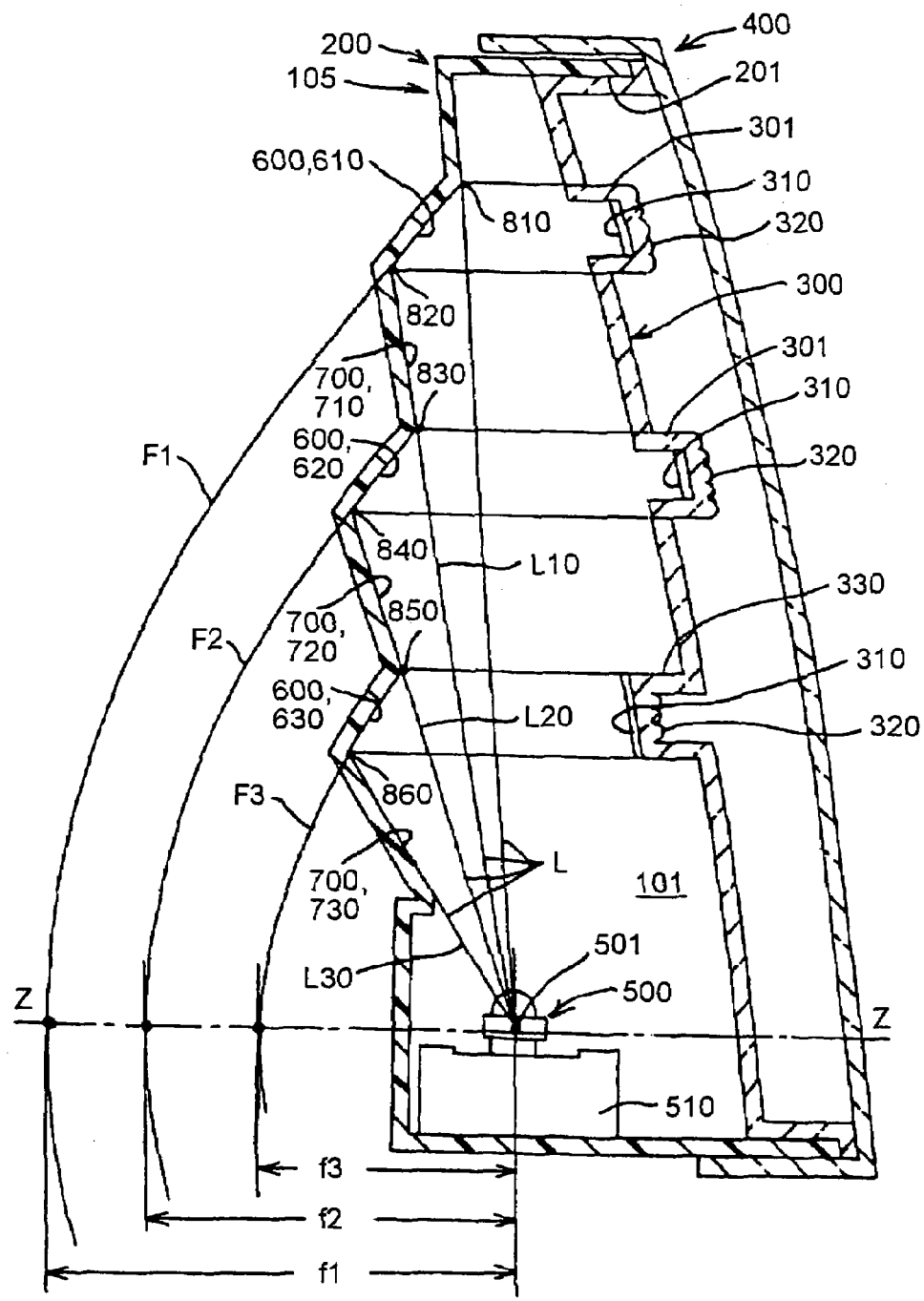
FIG. 24 is a longitudinal sectional view of a vehicle lamp according to a fifth embodiment the present invention.

FIG. 24 illustrates a vehicle lamp according to a fifth embodiment of the present invention. This fifth embodiment is a modification of the second embodiment. In FIG. 24, the same reference symbols as those in FIG. 14 to FIG. 23 denote the same constituent elements, respectively.

A stop lamp 105 has concave portions 330 provided in place of the convex portions 301. Namely, the concave portions 330 recessed on the opposite side to the outer lens 400 are provided in portions almost corresponding to the ranges in which the reflected lights LR from the reflection surface 600 are incident. Alternatively, the concave portion 330 may be a convex portion projected on the outer lens 400 side.

Similarly to the convex portion 301, an inner surface of the concave portion 330 is provided with the cylindrical light diffusion prism element group 310 having a vertical axis, and an outer surface thereof is provided with the cylindrical light diffusion prism element group 320 having a horizontal axis.

In the stop lamp 105, outer surfaces of upper and lower sidewalls of the three convex portions 301 and the three concave portions 330 provided vertically on the inner lens 300 almost correspond to the reflection surfaces 600, respectively.

The stop lamp 105 can attain almost the same operational effects as that of the stop lamp 100, 103 and 104 according to the first to the fourth embodiments.

Figure 25:
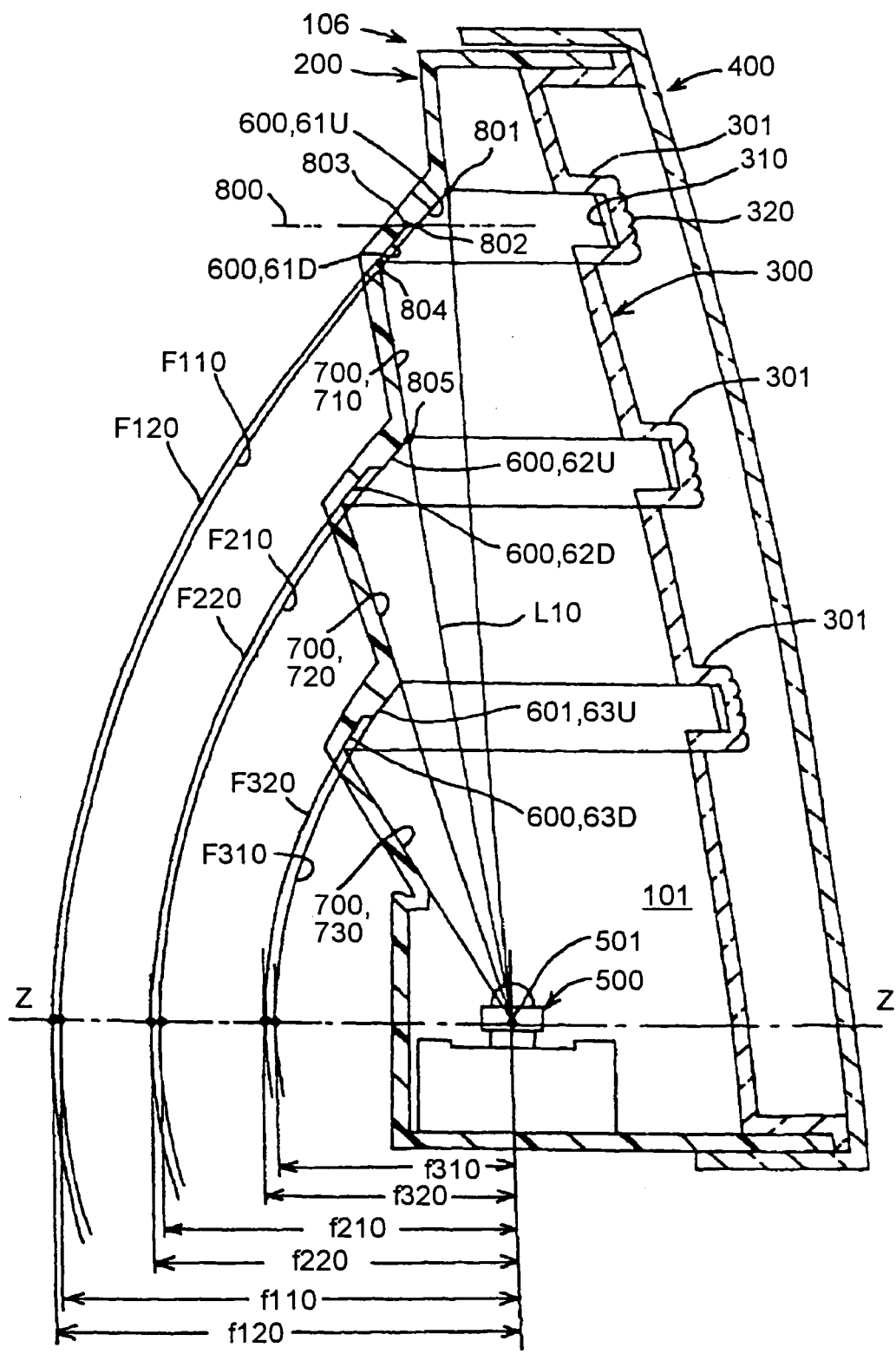
FIG. 25 is a longitudinal sectional view of a vehicle lamp according to a sixth embodiment the present invention.

FIG. 25 illustrates a vehicle lamp according to a sixth embodiment of the present invention. This sixth embodiment is a modification of the second embodiment. In FIG. 25, the same reference symbols as those in FIG. 14 to FIG. 24 denote the same constituent elements, respectively.

In a stop lamp 106, each of three vertical reflection surfaces 600 is divided into a plurality of reflection surfaces or, in the sixth embodiment two or upper and lower reflection surfaces (61U, 61D, 62U, 62D, 63U, and 63D). Steps of forming the vertically divided upper and lower reflection surfaces 600 (61U, 61D, 62U, 62D, 63U, and 63D) will be explained.

An upper boundary 801 of the first upper reflection surface 600 (61U) from the top is set first. A first upper small rotational paraboloid F110 having a focus on the light emission source 501 of the LED 500 and a focal length f110 that passes the upper boundary 801 is then formed. On the first upper small rotational paraboloid F110, a lower boundary 802 of the first upper reflection surface 600 (61U) from the top is arbitrarily set. If so setting, the first upper reflection surface 600 (61U) from the top is formed. A division line 800 (indicated by a two-dot chain line shown in FIG. 25) that passes the lower boundary 802 and that is almost parallel to the optical axis Z-Z is drawn.

Further, an upper boundary 803 of the first lower reflection surface 600 (61D) from the top is arbitrarily set on this division line 800 backward of the lower boundary 802 (an opposite side to the inner lens 300 and the outer lens 400). A first upper large rotational paraboloid F120 having a focus on the light emission source 501 of the LED 500 and a focal length f120 that passes the upper boundary 803 (a focal length f120 slightly larger than the focal length f110 of the first upper small rotational paraboloid F110) is then formed. On the first upper large rotational paraboloid F120, a lower boundary 804 of the first lower reflection surface 600 (61D) from the top is arbitrarily set. If so setting, the first lower reflection surface 600 (61D) from the top is formed. The lower boundary 804 is connected to the light emission source 501 of the LED 500 by the first segment L10.

On the first segment L10, an upper boundary 805 of the second upper reflection surface 600 (62D) from the top is arbitrarily set. If so, the first mirror finished surface 700 (71) from the top is formed. Likewise, the second upper reflection surface 600 (62U), the second lower reflection surface 600 (62D), the second mirror finished surface 700 (72), the third upper reflection surface 600 (63U), the third lower reflection surface 600 (63D), and the third mirror finished surface 700 (73) from the top are formed.

In FIG. 25, reference symbol F210 denote a second upper small rotational paraboloid, F220 a second lower small rotational paraboloid, F310 a third upper small rotational paraboloid, and F320 a third lower small rotational paraboloid from the top. Reference symbol f210 denotes a focal length of the second upper small rotational paraboloid F210, f220 a focal length of the second lower small rotational paraboloid F220, f310 a focal length of the third upper small rotational paraboloid F310, and f320 a focal length of the third lower small rotational paraboloid F320 from the top.

According to the stop lamp 106, when it is turned off, the outside light is incident on and reflected by the vertically divided upper and lower small reflection surfaces 600 (61U, 61D, 62U, 62D, 63U, and 63D), whereby the stop lamp 106 gives a glittering impression. Accordingly, the synergistic effect with the glittering impression given by the mirror finished surfaces 700 (710, 720, and 730) of the mirror blocks enables ensuring the glittering impression with higher brightness.

In the stop lamp 106, each reflection surface is divided into two or upper and lower surfaces. Alternatively, each reflection surface may be divided into three or more surfaces, divided into left and right surfaces, or divided obliquely.

Figure 26:
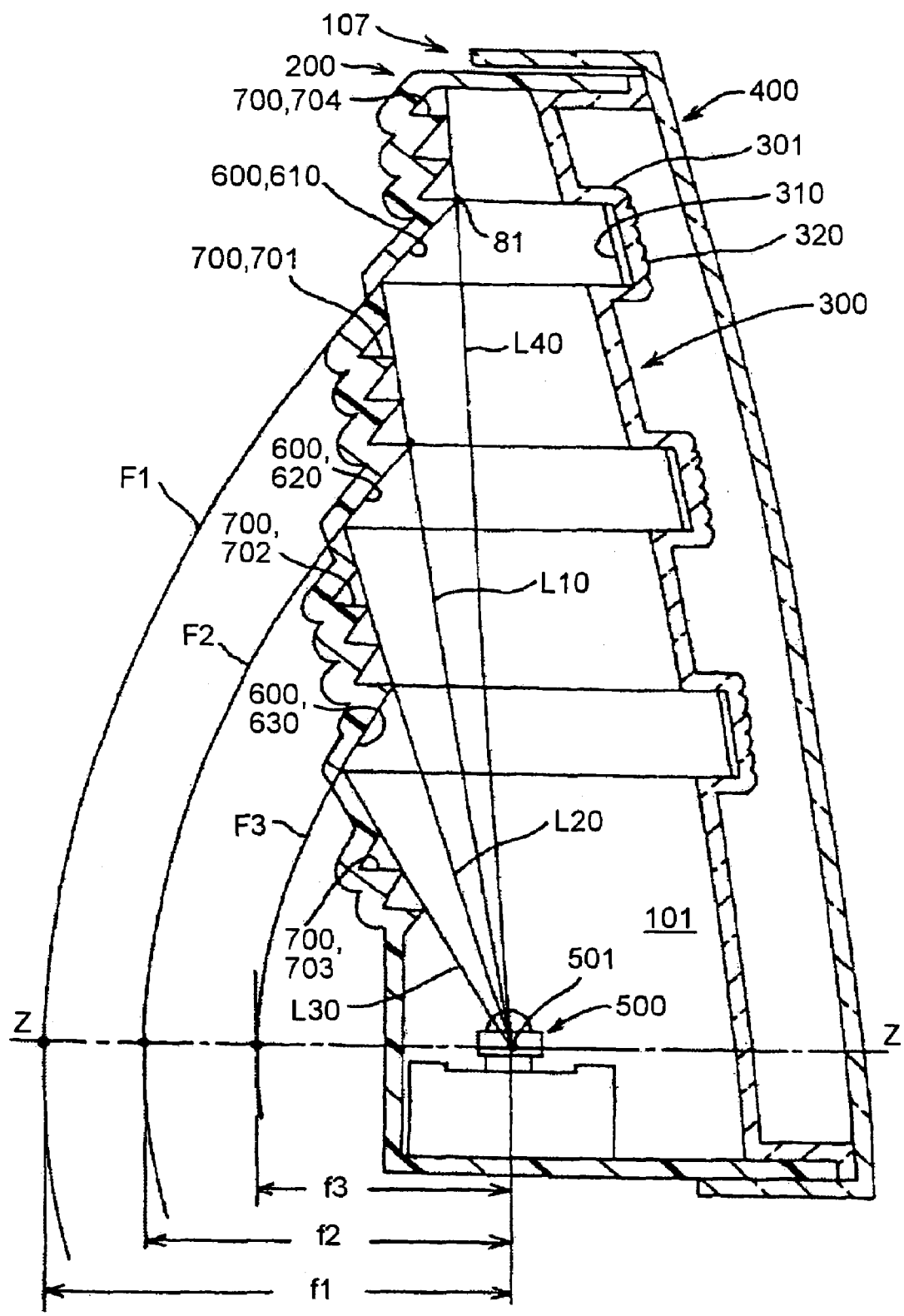
FIG. 26 is a longitudinal sectional view of a vehicle lamp according to a seventh embodiment the present invention.
Figure 27:
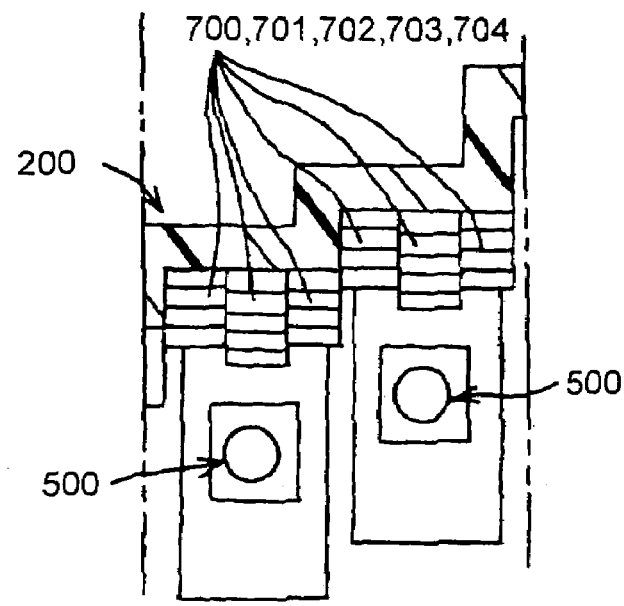
FIG. 27 is a partial cross-sectional view of mirror finished surfaces of mirror blocks in the seventh embodiment.
Figure 28:
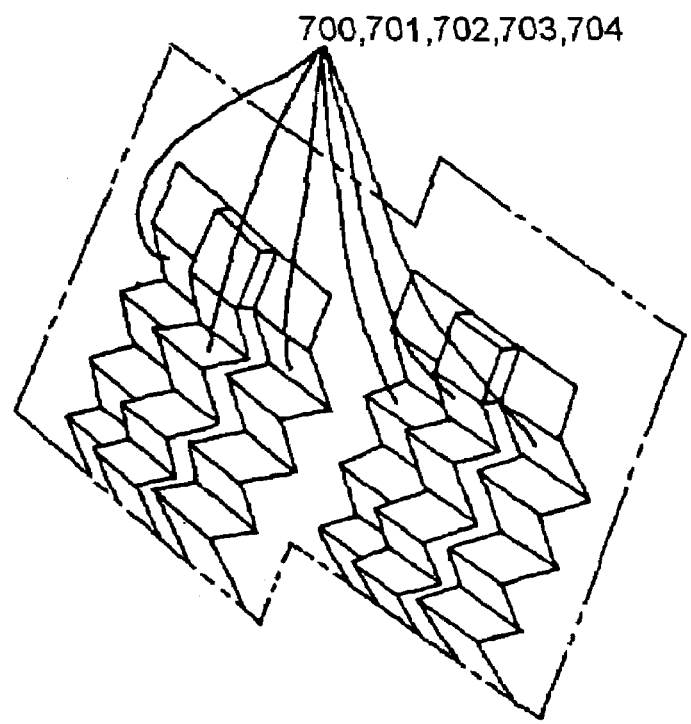
FIG. 28 is a partial perspective view of the mirror finished surfaces of the mirror blocks in the seventh embodiment.

FIG. 26 to FIG. 28 illustrate a vehicle lamp according to a seventh embodiment of the present invention. This seventh embodiment is a modification of the second embodiment. In FIG. 26 to FIG. 28, the same reference symbols as those in FIG. 14 to FIG. 25 denote the same constituent elements, respectively.

As illustrated in FIG. 26 to FIG. 28, in a stop lamp 107, each of mirror finished surfaces 700 (701, 702, 703, and 704) of mirror blocks is divided into a plurality of surfaces (two or three surfaces in this embodiment) to form a zigzag longitudinal section. The zigzag mirror finished surfaces 700 (701, 702, 703, and 704) are located backward of the first segment L10, the second segment L20, the third segment L30, and a fourth segment L40, respectively. The mirror finished surface denoted by reference symbol 704 is an auxiliary mirror finished surface formed on the fourth segment L40 that connects the upper boundary 810 of the first reflection surface 600 (61) from the top to the light emission source 501 of the LED 500. In addition, as illustrated in FIG. 27 and FIG. 28, each of the mirror finished surfaces 700 (701, 702, 703, and 704) is divided into three surfaces in a cross section and form irregularities in the longitudinal direction of the vehicle.

According to the stop lamp 107, the outside light is incident on and reflected by the small divided, zigzag mirror finished surfaces 700 (701, 702, 703, and 704), whereby the stop lamp 107 gives a glittering impression with higher brightness. The zigzag shape of the mirror finished surfaces 700 (701, 702, 703, and 704) is not limited to this embodiment. The stop lamp 107 gives the glittering impression with high brightness by the mirror finished surfaces 700 (701, 702, 703, and 704) each divided into three surfaces in the cross section and forming irregularities longitudinally.

Figure 29:
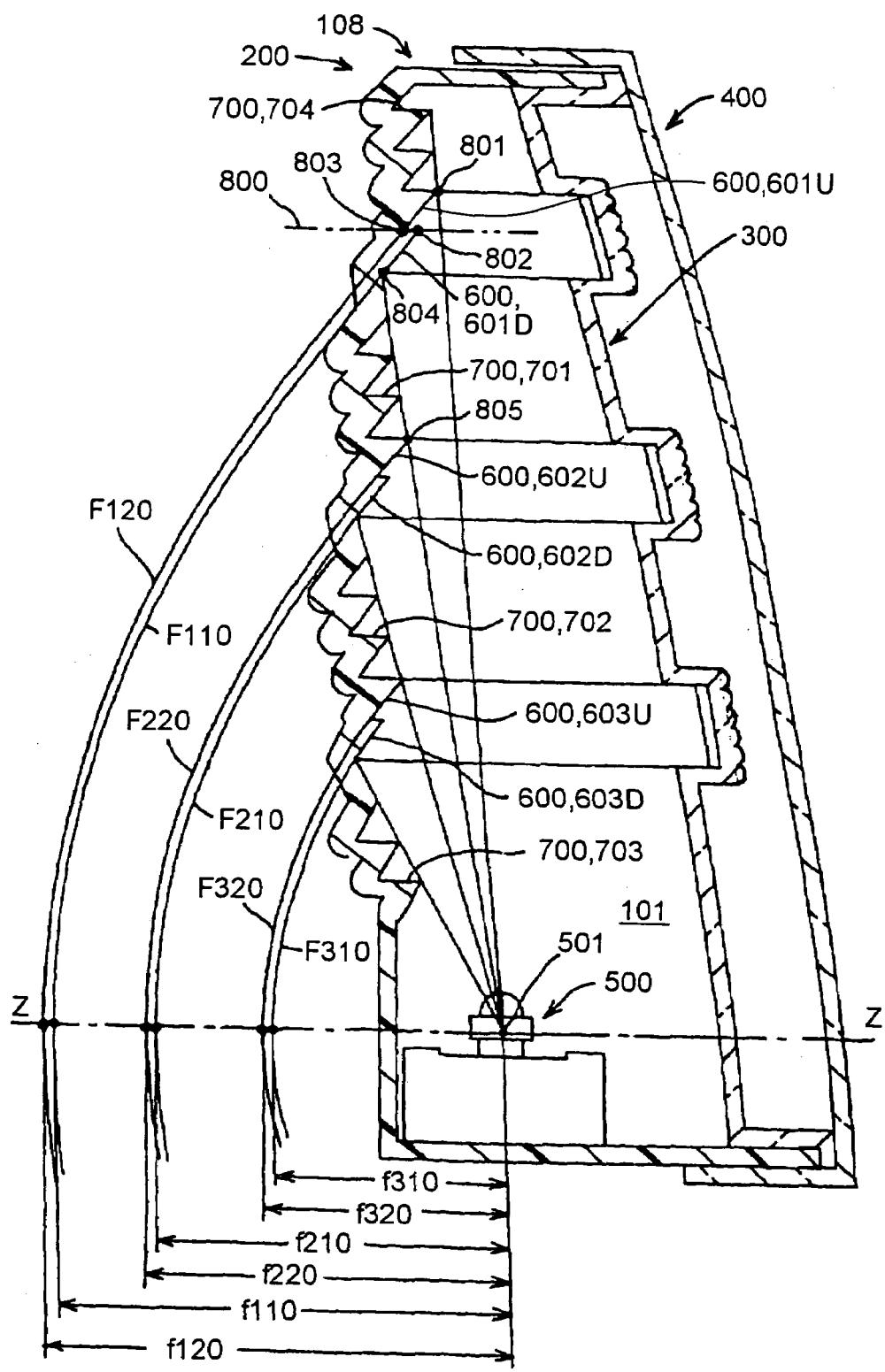
FIG. 29 is a longitudinal sectional view of a vehicle lamp according to an eighth embodiment the present invention.

FIG. 29 illustrates a vehicle lamp according to an eighth embodiment of the present invention. This eighth embodiment is a modification of the second embodiment. In FIG. 29, the same reference symbols as those in FIG. 14 to FIG. 28 denote the same constituent elements, respectively.

In a stop lamp 108, each of three vertical reflection surfaces 600 is divided into two or upper and lower reflection surfaces 600 (601U, 601D, 602U, 602D, 603U, and 603D). It is noted that the reflection surfaces 600 (601U, 601D, 602U, 602D, 603U, and 603D) are upside down relative to the reflection surfaces 600 (61U, 61D, 62U, 62D, 63U, and 63D) in the sixth embodiment. Namely, the first, the second, and the third upper reflection surfaces 600 (601U, 602U, and 603U) from the top are formed out of parts of large rotational paraboloids F120, F220, and F320 having focal lengths f120, f220, and f230 that are slightly larger than focal lengths of the lower rotational paraboloids, respectively. The first, the second, and the third lower reflection surfaces 600 (601D, 602D, and 603D) are formed out of parts of the small rotational paraboloids F110, F210, and F310 having focal lengths f110, f210, and f310 that are slightly smaller than the focal lengths of the lower rotational paraboloids, respectively.

Similarly to the seventh embodiment, in the stop lamp 108, each of the mirror finished surfaces 700 (701, 702, 703, and 704) of the mirror blocks is divided into a plurality of surfaces (two or three in this embodiment) to form a zigzag longitudinal section. In addition, each of the divided mirror finished surfaces is divided into three surfaces in the cross section to form irregularities.

According to the stop lamp 108, similarly to the sixth embodiment, when the stop lamp 108 is turned off, the outside light is incident on and reflected by the divided upper and lower small finished surfaces 600 (601U, 601D, 602U, 602D, 603U, and 603D), whereby the stop lamp 108 gives a glittering impression.

Further, in the stop lamp 108, similarly to the seventh embodiment, the outside light is incident on and reflected by the small mirror finished surfaces 700 (701, 702, 703, and 704) each divided in a zigzag fashion and forming irregularities longitudinally, whereby the stop lamp 108 gives the glittering impression with higher brightness.

The synergistic effect between the glittering impression given by the divided upper and lower small finished surfaces 600 (601U, 601D, 602U, 602D, 603U, and 603D) and the glittering impression given by the small finished surfaces 700 (701, 702, 703, and 704) divided in a zigzag fashion and having irregularities longitudinally enables the stop lamp 108 to give the glittering impression with higher brightness.

Although the first embodiment considers the tail and stop lamp 1 as an example of the vehicle lamp, the vehicle lamp may be other than the tail and stop lamp. For example, a high mount tail and stop lamp, a combination lamp of a turn signal lamp and a tail lamp, a combination lamp of a turn signal lamp and a stop lamp.

Although the second to the eighth embodiments consider the stop lamps 100 to 108 as examples of the vehicle lamp, the vehicle lamps may be other than the stop lamps 100 to 108, for example, high mount stop lamps, turn signal lamps, tail lamps.

The present document incorporates by reference the entire contents of Japanese priority documents, 2002-304971 filed in Japan on Oct. 18, 2002 and 2003-306253 filed in Japan on Aug. 29, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle lamp comprising:
    a light emitting diode that emits light;
    a lamp lens having a light emission area;
    a plurality of reflection surfaces that reflect the light emitted by the light emitting diode;
    a plurality of mirror finished surfaces that are arranged so as not to reflect the light emitted by the light emitting diode but to reflect an outside light incident from the lamp lens; and
    an inner housing having an inner surface facing the light emission area, wherein
    the reflection surfaces and the mirror finished surfaces are alternately provided over the inner surface of the inner housing,
    the reflection surfaces are arranged mostly within a range of an illumination angle of the light emitted by the light emitting diode,
    each of the reflection surfaces is a part of a rotational paraboloid having a focus on a light emission source of the light emitting diode such that the paraboloids corresponding to the reflection surfaces that are farther from the light emitting diode have longer focal lengths, and
    each of the mirror finished surfaces is arranged to follow along and parallel to a segment that connects the light emission source of the light emitting diode to one of boundaries between the reflection surfaces and the mirror finished surfaces.

2. The vehicle lamp according to claim 1, further comprising a plurality of linear Fresnel prism elements arranged between the light emitting diode and the reflection surfaces, wherein
    the linear Fresnel prism elements transmit the light emitted by the light emitting diode mostly along the direction the light is emitted in a cross section that includes the reflection surfaces, the mirror finished surfaces, and the light emitting diode, and refract and transmit the light emitted by the light emitting diode as almost parallel lights in a cross section orthogonal to the light reflection direction of the reflection surfaces.

3. The vehicle lamp according to claim 1, wherein the lamp lens includes:
    an outer lens; and
    an inner lens, wherein a plurality of at least one of concave portions or convex portions are provided, in portions of the inner lens almost corresponding to ranges in which reflected lights from the reflection surfaces are incident, respectively, in such a manner that the concave portions recess on an opposite side to a reflection surfaces-side and the convex portions project on the reflection surfaces-side.

4. The vehicle lamp according to claim 1, wherein the lamp lens includes:
    an outer lens; an
    inner lens, wherein a plurality of at least one of concave portions or convex portions are provided, in portions of the inner lens almost corresponding to ranges in which reflected lights from the reflection surfaces are incident, respectively, in such a manner that the concave portions recess on an opposite side to a reflection surfaces-side and the convex portions project on the reflection surfaces-side; and a plurality of light diffusion prism elements arranged on at least one of outer surfaces or inner surfaces of at least either the convex portions or the concave portions of the inner lens.

5. The vehicle lamp according to claim 1, wherein a plurality of the light emitting diodes are provided, wherein each of the light emitting diodes and the reflection surfaces are integrated into an arrangement, so that there are a plurality of the arrangements, wherein each of the arrangements is positioned at a different location in a light reflection direction of the reflection surfaces.

6. The vehicle lamp according to claim 1, wherein a 0° axis of the light emitting diode is inclined toward a reflection surfaces-side relative to an optical axis of the reflection surfaces.

7. The vehicle lamp according to claim 1, wherein the reflection surfaces have different optical axis directions.

8. The vehicle lamp according to claim 1, wherein each of the reflection surfaces is divided into a plurality of reflection surfaces.

9. The vehicle lamp according to claim 1, wherein each of the mirror finished surfaces is divided into a plurality of zigzag surfaces.

10. The vehicle lamp according to claim 1, wherein each of the mirror finished surfaces is arranged on the segment on a side opposite to a light reflection direction of the reflection surfaces.

11. A vehicle lamp comprising:

at least one light emitting diode that emits light;

a lamp lens having a light emission area;

a plurality of reflection surfaces that reflect the light emitted by the at least one light emitting diode;

a plurality of mirror finished surfaces arranged so as not to reflect the light emitted by the light emitting diode but to reflect a light incident from outside the lamp lens; and an inner housing having an inner surface facing the light emission area, wherein the reflection surfaces and the mirror finished surfaces are alternately provided over the inner surface of the inner housing, the reflection surfaces are arranged mostly within a range of an illumination angle of the light emitted by the at least one light emitting diode, each of the reflection surfaces is defined by a rotational paraboloid having a focus on a light emission source of the at least one light emitting diode such that the paraboloids corresponding to the reflection surfaces that are farther from the at least one light emitting diode have longer focal lengths, and each of the mirror finished surfaces is arranged to follow along and parallel to a segment that connects the light emission source of the at least one light emitting diode to one of boundaries between the reflection surfaces and the mirror finished surfaces.

12. The vehicle lamp according to claim 11, wherein each of the mirror finished surfaces is arranged on the segment on a side opposite to a light reflection direction of the reflection surfaces.

13. A vehicle lamp comprising:

a first light emitting diode that is arranged at a first location and that emits light in a first area;

a second light emitting diode that is arranged at a second location different from the first location and that emits light in a second area;

a lamp lens having a light emission area;

a plurality of first reflection surfaces that reflect the light emitted by the first light emitting diode toward the lamp lens;

a plurality of second reflection surfaces that reflect light emitted by the second light emitting diode toward the lamp lens;

a plurality of first linear Fresnel prism elements arranged between the first light emitting diode and the first reflection surfaces;

a plurality of second linear Fresnel prism elements arranged between the second light emitting diode and the second reflection surfaces; and an inner housing having an inner surface facing the light emission area, wherein the first reflection surfaces and the second reflection surfaces are alternately provided over almost entire of the inner surface of the inner housing, the first reflection surfaces are arranged mostly in the first area, the second reflection surfaces are arranged mostly in the second area, each of the first reflection surfaces is a part of a rotational paraboloid having a focus on a light emission source of the first light emitting diode such that the paraboloids corresponding to the first reflection surfaces that are farther from the first light emitting diode have longer focal lengths, and each of the second reflection surfaces is a part of a rotational paraboloid having a focus on a light emission source of the second light emitting diode such that the paraboloids corresponding to the second reflection surfaces that are farther from the second light emitting diode have longer focal lengths, wherein the first linear Fresnel prism elements transmit the light emitted by the first light emitting diode mostly along the direction the light is emitted in a cross section that includes the first light emitting diode and the first reflection surfaces, and refract and transmit the light emitted by the first light emitting diode as almost parallel light in a cross section orthogonal to a light reflection direction of the first reflection surfaces, and the second linear Fresnel prism elements transmit the light emitted by the second light emitting diode mostly along the direction the light is emitted in a cross section that includes the second light emitting diode and the second reflection surfaces, and refract and transmit the light from the second light emitting diode as almost parallel light in a cross section orthogonal to a light reflection direction of the second reflection surfaces.

14. The vehicle lamp according to claim 13, wherein a plurality of the first light emitting diodes and the second light emitting diodes are provided, and each of the first light emitting diodes, each of the second light emitting diodes, the first reflection surfaces, and the second reflection surfaces are integrated into an arrangement, so that there are a plurality of the arrangements, wherein each of the arrangements is positioned at a different location in a light reflection direction of the first reflection surfaces and the second reflection surfaces.

15. The vehicle lamp according to claim 13, wherein
a 0° axis of the first light emitting diode is inclined toward a first reflection surfaces-side relative to an optical axis of the first reflection surfaces, and
a 0° axis of the second light emitting diode is inclined toward the second reflection surfaces-side relative to an optical axis of the second reflection surfaces.

16. The vehicle lamp according to claim 13, wherein an optical axis direction of the first reflection surfaces differs from an optical axis direction of the second reflection surfaces.

17. The vehicle lamp according to claim 13, wherein the lamp lens includes:
an outer lens; and
an inner lens, wherein
a plurality of at least one of concave portions or convex portions are provided, in portions of the inner lens almost corresponding to ranges in which reflected lights from the first reflection surfaces are incident, respectively, in such a manner that the concave portions recess on an opposite side to a first reflection surfaces-side and the convex portions project on the first reflection surfaces-side, and
a plurality of at least one of concave portions or convex portions are provided, in portions of the inner lens almost corresponding to ranges in which reflected lights from the second reflection surfaces are incident, respectively, in such a manner that the convex portions project on a second reflection surfaces-side and the concave portions recess on an opposite side to the second reflection surfaces-side, and
the concave portions and the convex portions of the inner lens are alternately provided in the light emission area of the lamp lens almost over the entire light emission area to correspond to the first reflection surfaces and the second reflection surfaces, respectively.

18. The vehicle lamp according to claim 17, wherein the lamp lens further includes:
a plurality of light diffusion prism elements arranged on any of an outer surface or an inner surface of any one or more of the convex portions and the concave portions of the inner lens.

19. A vehicle lamp comprising:
at least one first light emitting diode arranged at a first location and that emits light in a first area;
at least one second light emitting diode arranged at a second location different from the first location and that emits light in a second area;
a lamp lens having a light emission area;
a plurality of first reflection surfaces that reflect the light emitted by the at least one first light emitting diode toward the lamp lens;
a plurality of second reflection surfaces that reflect light emitted by the at least one second light emitting diode toward the lamp lens; and
an inner housing having an inner surface facing the light emission area, wherein
the first reflection surfaces and the second reflection surfaces are alternately provided over the inner surface of the inner housing,
the first reflection surfaces are arranged in the first area,
the second reflection surfaces are arranged in the second area,
each of the first reflection surfaces is defined by a rotational paraboloid having a focus on a light emission source of the at least one first light emitting diode such that the paraboloids corresponding to the first reflection surfaces that are farther from the at least one first light emitting diodes have longer focal lengths, and
each of the second reflection surfaces is defined by a rotational paraboloid having a focus on a light emission source of the at least one second light emitting diode such that the paraboloids corresponding to the second reflection surfaces that are farther from the at least one second light emitting diode have longer focal lengths,
wherein the lamp lens includes:
an outer lens; and
an inner lens, wherein
a plurality of at least one of concave portions or convex portions are provided, in portions of the inner lens almost corresponding to ranges in which reflected lights from the first reflection surfaces are incident, respectively, in such a manner that the concave portions recess on an opposite side to a first reflection surfaces-side and the convex portions project on the first reflection surfaces-side, and
a plurality of at least one of concave portions or convex portions are provided, in portions of the inner lens almost corresponding to ranges in which reflected lights from the second reflection surfaces are incident, respectively, in such a manner that the convex portions project on a second reflection surfaces-side and the concave portions recess on an opposite side to the second reflection surfaces-side, and
the concave portions and the convex portions of the inner lens are alternately provided in the light emission area of the lamp lens almost over the entire light emission area to correspond to the first reflection surfaces and the second reflection surfaces, respectively.

* * * * *